US012187031B2

(12) United States Patent
Terada et al.

(10) Patent No.: US 12,187,031 B2
(45) Date of Patent: Jan. 7, 2025

(54) CARTRIDGE, THERMAL PRINTER USING THE CARTRIDGE, MEDIUM FOR USE WITH THE THERMAL PRINTER, AND METHOD FOR CREATING LAMINATED MEDIUM

(71) Applicant: BROTHER KOGYO KABUSHIKI KAISHA, Nagoya (JP)

(72) Inventors: Kohei Terada, Kiyosu (JP); Keisuke Nishihara, Nagoya (JP); Akira Minami, Nagoya (JP); Tomoaki Hazeyama, Yokkaichi (JP); Yasuhiro Torii, Kariya (JP); Mariko Niizeki, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 386 days.

(21) Appl. No.: 16/915,634

(22) Filed: Jun. 29, 2020

(65) Prior Publication Data

US 2021/0008909 A1 Jan. 14, 2021

(30) Foreign Application Priority Data

Jul. 9, 2019 (JP) ................................ 2019-127675

(51) Int. Cl.
*B41J 15/04* (2006.01)
*B41J 2/32* (2006.01)
(Continued)

(52) U.S. Cl.
CPC ............... *B41J 15/044* (2013.01); *B41J 2/32* (2013.01); *B41J 3/36* (2013.01); *B41J 3/4075* (2013.01);
(Continued)

(58) Field of Classification Search
CPC ...... B41J 15/044; B41J 15/042; B41J 15/046; B41J 2/32; B41J 3/36; B41J 3/4075;
(Continued)

(56) References Cited

U.S. PATENT DOCUMENTS 5,534,907 A 7/1996 Tsutsui et al.
5,552,364 A 9/1996 Tsutsui et al.
(Continued)

FOREIGN PATENT DOCUMENTS

CN 101239545 A 8/2008
CN 202293713 U 7/2012
(Continued)

OTHER PUBLICATIONS

Extended European Search Report for the related European Patent Application No. 20183869.5 dated Jun. 10, 2022.
(Continued)

*Primary Examiner* — Douglas X Rodriguez
*Assistant Examiner* — Kendrick X Liu
(74) *Attorney, Agent, or Firm* — KENEALY VAIDYA LLP

(57) ABSTRACT

A cartridge includes: a cartridge case; a first supply portion including a heat-sensitive medium; and a second supply portion including an adhesive medium. The heat-sensitive medium includes a base material, a plurality of heat-sensitive layers, and at least one heat-insulating layer in a stacked state. The heat-sensitive layers include: a first heat-sensitive layer for producing a first color when heated above a first temperature; and a second heat-sensitive layer for producing a second color when heated above a second temperature higher than the first temperature. The cartridge case includes: an opening for exposing the heat-sensitive medium; and a guide part positioned downstream of the opening in a conveying direction of the heat-sensitive
(Continued)

medium for guiding the heat-sensitive medium and the adhesive medium bonded to a surface of the heat-sensitive medium opposite the base material with respect to the plurality of heat-sensitive layers.

26 Claims, 11 Drawing Sheets

(51) Int. Cl.

| | |
|---|---|
| ***B41J 3/36*** | (2006.01) |
| ***B41J 3/407*** | (2006.01) |
| ***B41M 5/41*** | (2006.01) |
| ***B41M 5/44*** | (2006.01) |
| ***B41M 5/46*** | (2006.01) |
| ***C09J 133/00*** | (2006.01) |

(52) U.S. Cl.
CPC ........... *B41J 15/042* (2013.01); *B41J 15/046* (2013.01); *B41M 5/41* (2013.01); *B41M 5/44* (2013.01); *B41M 5/46* (2013.01); *C09J 133/00* (2013.01); *B41M 2205/04* (2013.01); *B41M 2205/32* (2013.01); *B41M 2205/38* (2013.01); *B41M 2205/40* (2013.01)

(58) Field of Classification Search
CPC ...... B41M 5/41; B41M 5/44; B41M 2205/04; B41M 2205/32; B41M 2205/38; B41M 2205/40
See application file for complete search history.

(56) References Cited

U.S. PATENT DOCUMENTS

| | | | | |
|---|---|---|---|---|
| 6,265,344 | B1 * | 7/2001 | Shimbo | B41M 5/305 503/205 |
| 6,297,840 | B1 | 10/2001 | Inana | |
| 2002/0122920 | A1 * | 9/2002 | Chikami | G09F 3/10 503/227 |
| 2003/0134105 | A1 * | 7/2003 | Toshine | G09F 3/0292 428/323 |
| 2006/0232642 | A1 | 10/2006 | Busch et al. | |
| 2006/0292502 | A1 | 12/2006 | Busch et al. | |
| 2007/0098473 | A1 * | 5/2007 | Heyse | B41J 11/009 400/621 |
| 2008/0113863 | A1 * | 5/2008 | Iino | B41M 5/305 503/226 |
| 2009/0236429 | A1 * | 9/2009 | Hioki | B31D 1/027 235/492 |
| 2010/0247209 | A1 | 9/2010 | Yamaguchi et al. | |
| 2010/0247210 | A1 | 9/2010 | Yamaguchi et al. | |
| 2011/0063392 | A1 | 3/2011 | Wu et al. | |
| 2012/0008999 | A1 | 1/2012 | Yamaguchi et al. | |
| 2012/0039651 | A1 * | 2/2012 | Yamaguchi | B41J 3/50 400/613 |
| 2012/0080550 | A1 | 4/2012 | Yamaguchi et al. | |
| 2013/0021421 | A1 * | 1/2013 | Ishikawa | B41J 2/32 347/172 |
| 2019/0061375 | A1 | 2/2019 | Matsumoto | |
| 2020/0117122 | A1 * | 4/2020 | Nemoto | B41M 5/34 |

FOREIGN PATENT DOCUMENTS

| | | | | | |
|---|---|---|---|---|---|
| CN | 102785498 | A | | 11/2012 | |
| CN | 108883648 | A | | 11/2018 | |
| EP | 1 866 161 | B1 | | 10/2014 | |
| EP | 3 437 893 | A1 | | 2/2019 | |
| JP | S49-108177 | A | | 10/1974 | |
| JP | S49-127472 | U | | 10/1974 | |
| JP | H01-105778 | A | | 4/1989 | |
| JP | H06-079970 | A | | 3/1994 | |
| JP | H07-084523 | A | | 3/1995 | |
| JP | H0834163 | A | * | 2/1996 | |
| JP | H10-235996 | A | | 9/1998 | |
| JP | H11-002896 | A | | 1/1999 | |
| JP | H11-327445 | A | | 11/1999 | |
| JP | 2000-071494 | A | | 3/2000 | |
| JP | 2006-138976 | A | | 6/2006 | |
| JP | 2008-006830 | A | | 1/2008 | |
| JP | 2008-105234 | A | | 5/2008 | |
| JP | 2008-146030 | A | | 6/2008 | |
| JP | 2008-538332 | A | | 10/2008 | |
| JP | 2008268380 | A | * | 11/2008 | |
| JP | 2012-076312 | A | | 4/2012 | |
| JP | 2012-086568 | A | | 5/2012 | |
| JP | 2012-245769 | A | | 12/2012 | |
| JP | 2013-208786 | A | | 10/2013 | |
| JP | 2016068437 | A | * | 5/2016 | |
| JP | 2017-177438 | A | | 10/2017 | |
| WO | 02/096665 | A1 | | 12/2002 | |
| WO | 2006/033393 | A1 | | 3/2006 | |
| WO | 2006/108171 | A2 | | 10/2006 | |
| WO | 2006/108172 | A2 | | 10/2006 | |
| WO | WO-2017170130 | A1 | * | 10/2017 | B41J 15/044 |

OTHER PUBLICATIONS

Extended European Search Report for the related European Patent Application No. 20183869.5 dated Nov. 30, 2020.
Chinese Office Action for the related Chinese Patent Application No. 202010650795.6 dated Nov. 30, 2022.
Chinese Office Action for the related Chinese Patent Application No. 202010650795.6 dated Oct. 20, 2023.
Japanese Office Action for the related Japanese Patent Application No. 2019-127675 dated Aug. 8, 2023.
Japanese Office Action for the related Japanese Patent Application No. 2019-127675 dated Apr. 4, 2023.
Chinese Office Action for the related Chinese Patent Application No. 202010650795.6 dated Jun. 13, 2024.

* cited by examiner

CARTRIDGE, THERMAL PRINTER USING THE CARTRIDGE, MEDIUM FOR USE WITH THE THERMAL PRINTER, AND METHOD FOR CREATING LAMINATED MEDIUM

CROSS REFERENCE TO ELATED APPLICATION

This application claims priority from Japanese Patent Application No. 2019-127675 filed Jul. 9, 2019. The entire content of the priority application is incorporated herein by reference.

TECHNICAL FIELD

The present disclosure relates to a cartridge, a thermal printer, a medium, and a method for creating a laminated medium.

BACKGROUND

Japanese Patent Application Publication no. 2017-177438 (Patent Document 1) describes a cartridge, a thermal printer, a heat-sensitive medium, and an adhesive medium. The heat-sensitive medium and adhesive medium are accommodated in the cartridge. The heat-sensitive medium has a heat-sensitive layer, a first protective layer, and a second protective layer. The heat-sensitive layer produces a single color when heated. The first protective layer and second protective layer are respectively provided on opposite sides of the heat-sensitive layer with respect to a thickness direction of the medium in order to protect the heat-sensitive layer. The cartridge is detachably mounted in the thermal printer. The thermal printer performs printing while a cartridge is mounted therein by heating the heat-sensitive medium from the side of the second protective layer to develop color in the heat-sensitive medium, Subsequently, the printer creates a laminated medium printed with a single color by bonding the adhesive medium to the printed heat-sensitive medium.

Japanese Patent Application Publication no. 2013-208786 (Patent Document 2) describes a heat-sensitive medium having a base material, and a plurality of heat-sensitive layers. The heat-sensitive layers produce respectively different colors when heated to different temperatures, in this way, print results having a plurality of colors are created.

SUMMARY

The printer of Patent Document 1 cannot produce a laminated medium with diverse multicolor images since the printer prints in monochrome. In Patent Document 2, an adhesive layer is not provided on a side of the medium opposite the base material and, hence, the heat-sensitive layer is less protected than the heat-sensitive layer in Patent Document 1.

Conceivably, the adhesive medium disclosed in Patent Document 1 could be bonded to the heat-sensitive medium disclosed in Patent Document 2 on the side opposite the base material in order to protect the heat-sensitive layers described in Patent Document 2. However, since the base material in Patent Document 2 is white, a user may be unable to discern the image printed in the heat-sensitive medium.

In view of the foregoing, it is an object of the disclosure to provide a cartridge, a thermal printer, a medium, and a method of creating a laminated medium capable of expanding a range of reproducible colors in the laminated medium while protecting heat-sensitive layers in the medium.

In order to attain the above and other objects, according to one aspect, the disclosure provides a cartridge for use with a thermal printer. The cartridge includes a cartridge case, a first supply portion and a second supply portion. The first supply portion is retained in the cartridge ease and includes a heat-sensitive medium. The heat-sensitive medium defines a thickness in a thickness direction, and has a first surface and a second surface opposite each other in the thickness direction. The second supply portion is retained in the cartridge case, and includes an adhesive medium. The heat-sensitive medium includes: a base material having visible light transmittance and constituting the first surface; a plurality of heat-sensitive layers having visible light transmittance; and at least one heat-insulating layer having visible light transmittance and including a first heat-insulating layer. The plurality of heat-sensitive layers includes: a first heat-sensitive layer configured to produce a first color when heated above a first temperature; and a second heat-sensitive layer configured to produce a second color when heated above a second temperature higher than the first temperature. The base material, the first heat-sensitive layer, the first heat-insulating layer, and the second heat-sensitive layer are stacked in a recited order in the thickness direction. The cartridge case includes: an opening through which the heat-sensitive medium conveyed from the first supply portion is configured to be exposed to an outside of the cartridge case; and a guide part positioned downstream of the opening in a conveying direction of the heat-sensitive medium. The guide part is configured to guide the heat-sensitive medium and the adhesive medium bonded to the second surface of the heat-sensitive medium such that the adhesive medium is positioned opposite the base material with respect to the plurality of heat-sensitive layers.

According to another aspect, the disclosure provides a thermal printer including a cartridge attachment portion, and a thermal head. The above-described cartridge according to one aspect is detachably attachable to the cartridge attachment portion. The thermal head is configured to heat the heat-sensitive medium exposed to an outside of the cartridge case through the opening while the cartridge is attached to the cartridge attachment portion. The thermal head is positioned opposite the base material with respect to the plurality of heat-sensitive layers in the thickness direction while the cartridge is attached to the cartridge attachment portion.

According to still another aspect, the disclosure also provides a thermal printer including a first attachment, a second attachment portion, a thermal head, and a laminating portion. To the first attachment portion, a first supply portion is detachably attachable. The first supply portion includes a heat-sensitive medium defining a thickness in a thickness direction, the heat-sensitive medium having a first surface and a second surface opposite each other in the thickness direction. To the second attachment portion, a second supply portion is detachably attachable. The second supply portion includes an adhesive medium. The thermal head is configured to heat the heat-sensitive medium supplied from the first supply portion attached to the first attachment portion. The laminating portion is positioned downstream of the thermal head in a conveying direction of the heat-sensitive medium. The heat-sensitive medium includes: a base material having visible light transmittance and constituting the first surface; and a plurality of heat-sensitive layers having visible light transmittance; and at least one heat-insulating layer having visible light transmittance and including a first heat-insulating layer. The base material, the first heat-sensitive layer, the first heat-insulating layer, and the second heat-sensitive layer are stacked in a recited order in the thickness direction. The thermal head is positioned opposite to the base material with respect to the plurality of heat-sensitive layers in the thickness direction. The laminating portion is configured to bond the adhesive medium to the second surface of the heat-sensitive medium.

According to still another aspect, the disclosure also provides a medium for use with a thermal printer. The medium includes: a base material having visible light transmittance; a plurality of heat-sensitive layers having visible light transmittance; and at least one heat-insulating layer having visible light transmittance and including a first heat-insulating layer. The plurality of heat-sensitive layers includes: a first heat-sensitive layer configured to produce a first color when heated above a first temperature; and a second heat-sensitive layer configured to produce a second color when heated above a second temperature higher than the first temperature. The base material, the first heat-sensitive layer, the first heat-insulating layer, and the second heat-sensitive layer are stacked in a recited order in a thickness direction of the medium.

According to still another aspect, the disclosure also provides a method for creating a laminated medium with a thermal printer. The method includes: performing printing on the above-described medium through application of heat to a surface of the medium, the surface being opposite the base material with respect to the heat-sensitive layers; and bonding an adhesive medium to the surface of the medium to create the laminated medium.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Hereinafter, an embodiment of the present disclosure will be described while referring to FIGS. 1 through 9. The referenced drawings are used to describe the technical features made possible with the present disclosure. The configurations, control, and the like of the apparatuses described below are merely examples, and the present disclosure is net intended to be limited to these configurations, control, and the like.

A printing system according to the present embodiment will be described. The printing system of the present embodiment includes a the thermal printer 1 (see FIG. 1), and a tape cassette 30 (see FIG. 2).

Figure 1:
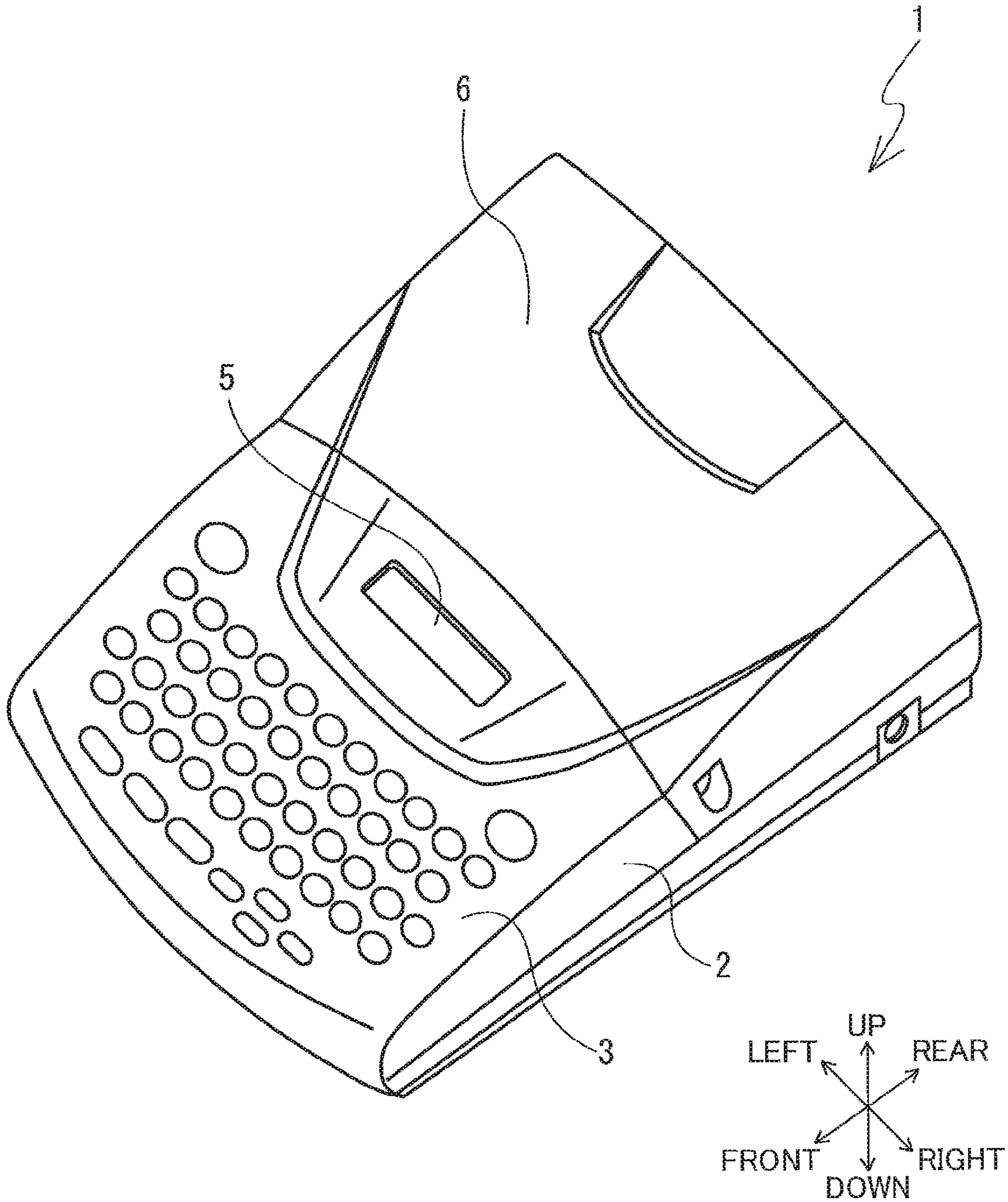
FIG. 1 is a perspective view of a thermal printer 1 according to one embodiment of the disclosure.
Figure 2:
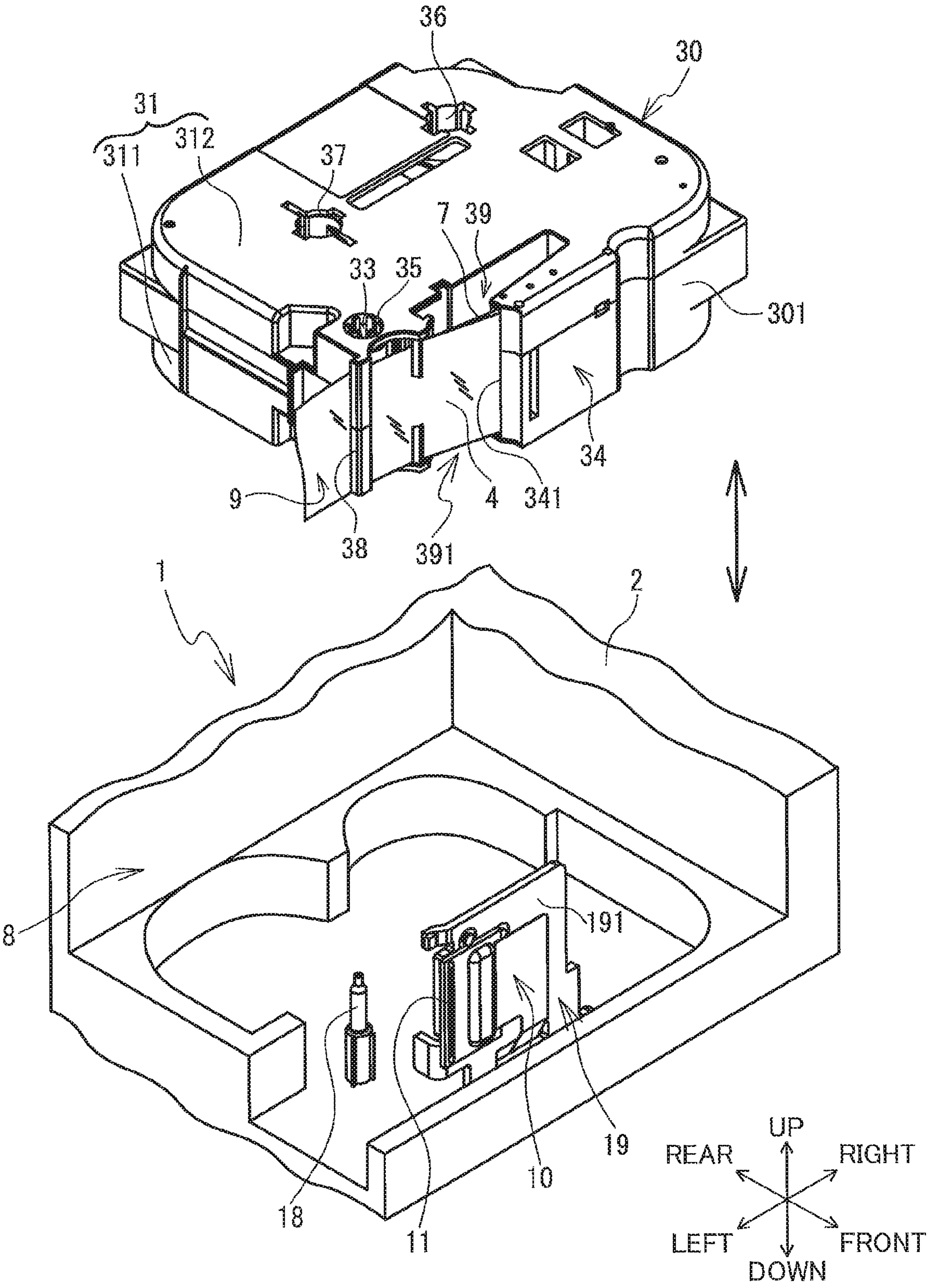
FIG. 2 is a perspective view of a tape cassette 30 and a cassette attachment portion. 8 of the thermal printer 1 according to the embodiment.

In the following description, the lower-left side, upper-right side, lower-right side, upper-left side, top side, and bottom side of a thermal printer 1 in FIG. 1 are respectively defined as the front side, rear side, right side, left side, top side, and bottom side of the thermal printer 1. The lower-right side, upper-left side, upper-right side, lower-left side, top side, and bottom side of the tape cassette 30 in FIG. 2 are respectively defined as the front side, rear side, right side, left side, top side, and bottom side of die tape cassette 30. Further, the tape cassette 30 mounted in a cassette attachment portion 8 of the thermal printer 1 (sec FIG. 3) is depicted without an upper ease 312 to facilitate understanding.

Using the tape cassette 30, the thermal printer 1 can print alphanumeric characters, symbols, graphics, and the like on a heat-sensitive tape 4. Subsequently, the thermal printer 1 bonds an adhesive tape 7 to the heat-sensitive tape 4 to create a laminated tape 9.

<External Structure of the Thermal Printer 1>

As shown in FIG. 1, the thermal printer 1 includes a device body 2. The device body 2 has a box shape. A keyboard 3 is provided on a front surface of the device body 2 in a front portion thereof. A user can input various types of information into the thermal printer 1 by operating the keyboard 3. A display 5 is provided in a top surface of the device body 2 to the rear of the keyboard 3. The display 5 can display inputted information.

A cassette cover 6 is provided to the rear of the display 5. The cassette cover 6 can be opened and closed on the device body 2 for exposing or covering the cassette attachment portion 8 described later (see FIG. 2). The user opens and closes the cassette cover 6 when replacing the tape cassette 30 (see FIG. 2). A discharge slit (not shown) is formed in a left side surface of the device body 2 in a rear portion thereof. The discharge slit allows the laminated tape 9 to be discharged from the thermal printer 1.

<Internal Structure of the Thermal Printer 1>

As shown in FIG. 2, the cassette attachment portion 8 is provided inside the device body 2 below the cassette cover 6 (see FIG. 1). The cassette attachment portion 8 is a recessed part that is recessed downward from the top surface of the device body 2 with a shape in conformance with a shape of the tape cassette 30. Thus, when the cassette cover 6 is open, the tape cassette 30 can be mounted in and removed from the cassette attachment portion 8. A head holder 19 is disposed in a front section of the cassette attachment portion 8. The head holder 19 has a plate-like shape and extends in vertical and left-right directions. The head holder 19 has a front surface 191. A thermal head 10 is provided on the front surface 191 of the head holder 19. The thermal head 10 includes a plurality of heating elements 11. The heating elements 11 are arranged in line with respect to the vertical direction. In a printing process described later, the thermal head 10 applies heat with the heating elements 11 to the heat-sensitive tape 4 exposed through an opening 341 (described later) while the tape cassette 30 is mounted in the cassette attachment portion 8.

A drive shaft 18 for conveying the heat-sensitive tape 4 and the adhesive tape 7 is disposed diagonally leftward and rearward from the head holder 19. The drive shaft 18 extends upward from a bottom surface of the cassette attachment portion 8. A conveying motor 95 (see FIG. 6) drives the drive shaft 18 to rotate.

Figure 3:
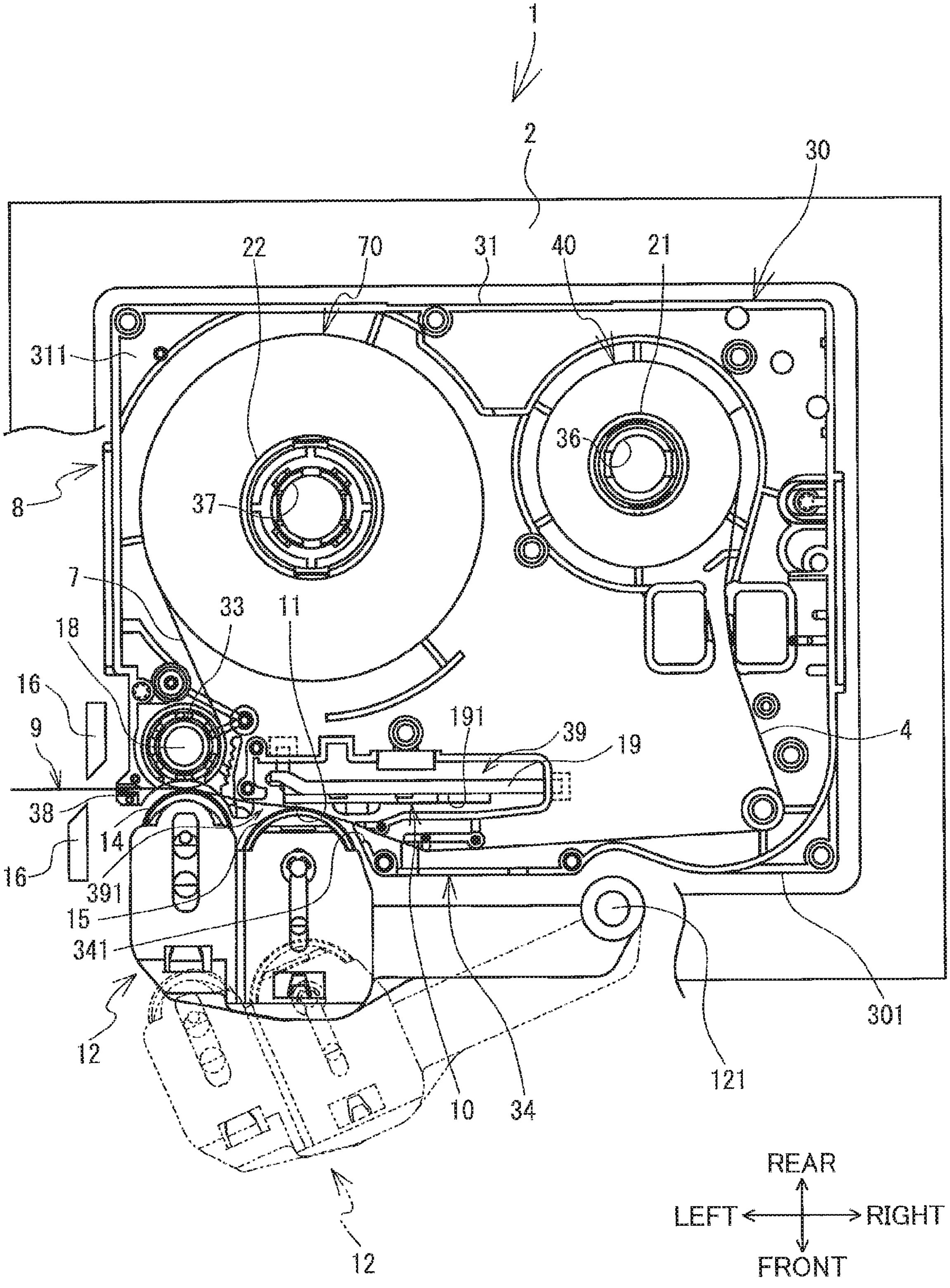
FIG. 3 is a plan view of the cassette attachment portion 8 to which the tape cassette 30 is attached.

As shown in FIG. 3, a cutting mechanism 16 is provided in the device body 2 on the left side of the drive shaft 18. When driven by a cutting motor 96 (see FIG. 6) provided in the thermal printer 1, the cutting mechanism 16 cuts the laminated tape 9. A platen holder 12 is provided in the device body 2 on the left side of the head holder 19. The platen holder 12 is an arm-like member and is pivotably supported by a support shaft 121 about an axis thereof aligned in the vertical direction. The support shaft 121 is disposed on a right end of the platen holder 12.

A platen roller 15 and a pinch roller 14 are rotatably supported on a free end portion of the platen holder 12. The platen roller 15 is configured to contact and separate from the thermal head 10 in accordance with the pivotal movement of the platen holder 12. The pinch roller 14 is disposed on the left side of the platen roller 15. The pinch roller 14 can contact and separate from a conveying roller 33 (described later) along with the pivotal movement of the platen holder 12.

In the present embodiment, the platen holder 12 is configured to move toward a standby position (the position depicted by dashed lines in FIG. 3) when the cassette cover 6 is open, and to move toward a printing position (the position depicted by solid lines in FIG. 3) when the cassette cover 6 is closed. In the standby position, the platen holder 12 is separated from the cassette attachment portion 8. Accordingly, the tape cassette 30 can be mounted in or removed from the cassette attachment portion 8.

In the printing position, the platen holder 12 is positioned adjacent to the cassette attachment portion 8. Accordingly, when the tape cassette 30 is mounted in the cassette attachment portion 8 and the cassette cover 6 is closed, die platen roller 15 presses the heat-sensitive tape 4 against the thermal head 10, and the pinch roller 14 presses the heat-sensitive tape 4 and adhesive tape 7 against the conveying roller 33 such that the heat-sensitive tape 4 and adhesive tape 7 are overlapped with each other.

The conveying motor 95 (see FIG. 6) is configured to drive the platen roller 15 to rotate together with the drive shaft 18. In order to avoid slack in the heat-sensitive tape 4 during conveyance of the heat-sensitive tape 4, the platen roller 15 and drive shaft 18 are coupled to the conveying motor 95 through a plurality of gears (not shown) so that a rotational speed of the platen roller 15 is slower than a rotational speed of the drive shaft 18 (the conveying roller 33).

<Structure of the Tape Cassette 30>

As shown in FIG. 2, the tape cassette 30 includes a cassette case 31. The cassette case 31 is a substantially rectangular parallelepiped case configured by assembling together a lower case 311, and the upper case 312.

An arm part 34 is provided on a front surface 301 of the cassette case 31. The arm part 34 extends leftward and forward from a right-front portion of the cassette case 31. The opening 341 is formed in a left end of the arm part 34. The opening 341 has a slit-like shape that is elongated vertically. The heat-sensitive tape 4 pulled off a first supply roll 40 described later (see FIG. 3) is configured to be discharged from the cassette case 31 through the opening 341. In this way, a portion of the heat-sensitive tape 4 is exposed on the outside of the cassette case 31.

A head insertion section 39 is formed in the cassette case 31 on the rear side of the arm part 34. The head insertion section 39 penetrates the cassette case 31 vertically. A left-front portion of the head insertion section 39 opens forward. Hereinafter, this opening will be called a head opening 391. The head opening 391 is positioned downstream (leftward) of the opening 341 formed in the arm part 34 with respect to a conveying direction of the heat-sensitive tape 4. The head holder 19 is inserted into the head insertion section 39 when the tape cassette 30 is mounted in the cassette attachment portion 8.

The conveying roller 33 is provided to the left side of the head insertion section 39. The conveying roller 33 is positioned between the opening 341 and a guide part 38 (described later) in the conveying direction of the heat-sensitive tape 4 (leftward direction). The conveying roller 33 is cylindrical in shape and elongated vertically. The conveying roller 33 has a front portion that is exposed frontward from the cassette case 31. The conveying roller 33 supports the adhesive tape 7 so that the heat-sensitive tape 4 and adhesive tape 7 are in a superimposed state. The conveying roller 33 is rotatably supported in a support hole 35. The support hole 35 penetrates the cassette case 31 vertically. The drive shaft 18 is inserted inside the conveying roller 33 when the tape cassette 30 is mounted in the cassette attachment portion 8. The drive shaft 18 is configured to drive the conveying roller 33 to rotate, so that the rotating conveying roller 33 can convey the heat-sensitive tape 4 and adhesive tape 7.

The guide part 38 is formed in a left-front corner portion of the cassette case 31. The guide part 38 is positioned downstream (left side) of the opening 341 in the conveying direction and downstream of the conveying roller 33 in the conveying direction. The guide part 38 has a slit-like shape that extends vertically. When conveyed by the conveying roller 33, the laminated tape 9 passes through the inside of the guide part 38. At this time, the guide part 38 support widthwise ends of the laminated tape 9 so that the laminated tape 9 can maintain an orientation thereof while being discharged from the cassette case 31. In other words, the guide part 38 guides the laminated tape 9 to the outside of the cassette case 31.

As shown in FIG. 3, the first supply roll 40 and a second supply roll 70 are accommodated inside the cassette case 31. The first supply roll 40 is provided in a right-rear portion of the cassette case 31 and supplies the heat-sensitive tape 4. The first supply roll 40 is configured of: a first tape spool 21; and the heat-sensitive tape 4 that is wound clockwise in a plan view over the first tape spool 21 so as to gradually separate from a rotational center of the first tape spool 21. Specifically, the heat-sensitive tape 4 is wound about the first tape spool 21 such that a plurality of heat-sensitive layers 42 is on the inside of a base material 41 described later (see FIG. 4A). The first tape spool 21 is rotatably supported in a support hole 36. The support hole 36 penetrates the cassette case 31 vertically.

The second supply roll 70 is disposed in a left-rear portion of the cassette case 31 on the left side of the first supply roll 40 and supplies the adhesive tape 7. The second supply roll 70 is configured of: a second tape spool 22; and the adhesive tape 7 that is wound over the second tape spool 22 in a counterclockwise direction in a plan view so as to gradually separate from a rotational center of the second tape spool 22. More specifically, the adhesive tape 7 is wound about the second tape spool 22 so that a first adhesive layer 73 is on the inside of a second adhesive layer 74 (and a release paper 75) described later (see FIG. 4B). The second tape spool 22 is rotatably supported in a support hole 37. The support hole 37 penetrates the cassette case 31 vertically.

<Structure of the Heat-Sensitive Tape 4>

In the following description, the top side and bottom side of each tape shown in FIGS. 4A to 4C will be referred to as the top and bottom of the tape.

Figure 4A:
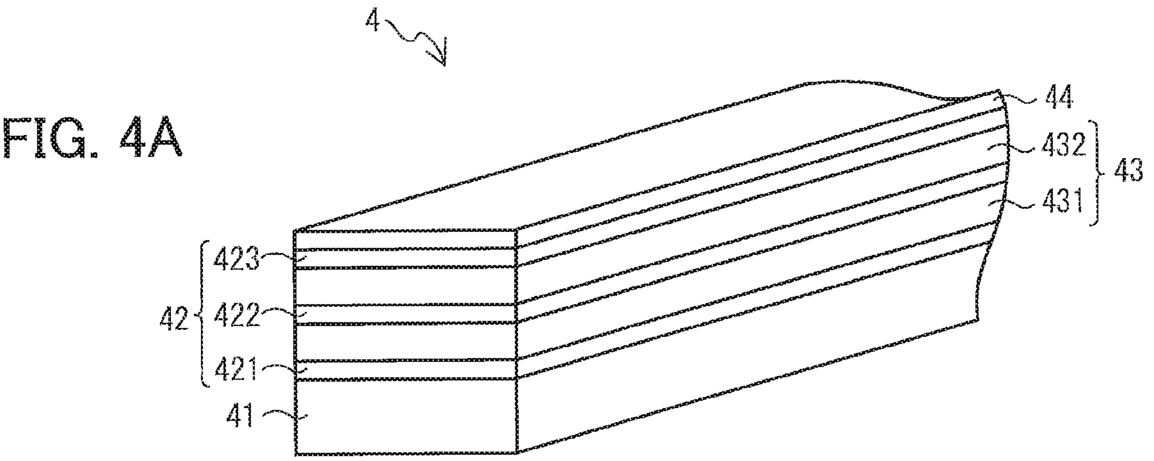
FIG. 4A is a perspective view illustrating layers of a heat-sensitive tape 4 accommodated in the tape cassette 30.

As shown in FIG. 4A, the heat-sensitive tape 4 is a long strip of a recording medium configured of a plurality of laminated layers. Specifically, the heat-sensitive tape 4 has the base material 41, a plurality of heat-sensitive layers 42, a plurality of heat-insulating layers 43, and an overcoat layer 44 (hereinafter collectively referred to as the "layers of the heat-sensitive tape 4"). In the present embodiment, the heat-sensitive layers 42 include a first heat-sensitive layer 421, a second heat-sensitive layer 422, and a third heat-sensitive layer 423. The heat-insulating layers 43 include a first heat-insulating layer 431, and a second heat-insulating layer 432.

The base material 41, first heat-sensitive layer 421, first heat-insulating layer 431, second heat-sensitive layer 422, second heat-insulating layer 432, third heat-sensitive layer 423, and overcoat layer 44 are laminated in a thickness direction of the heat-sensitive tape 4 (the vertical direction in FIG. 4A) in the order given, beginning from the bottom of the heat-sensitive tape 4. Thus, the overcoat layer 44 is provided opposite the base material 41 with respect to the heat-sensitive layers 42. That is, the overcoat layer 44 constitutes the top surface of the heat-sensitive tape 4.

The base material 41 is a resin film, and specifically a non-foamed resin film, and more specifically a non-foamed polyethylene terephthalate (PEI) film. In other words, gas bubbles are not trapped inside the base material 41.

Each of the heat-sensitive layers 42 produces a corresponding color when heated to a color-developing temperature specific to that layer. The heat-sensitive layers 42 achieve this effect through the use of chemicals, such as those described in Japanese Patent Application Publication No. 2008-006830.

The first heat-sensitive layer 421 is formed as a film by coating the bottom surface of the first heat-insulating layer 431 with a chemical agent. The first heat-sensitive layer 421 produces a first color when heated above a first temperature. In the present embodiment, the first color is cyan.

The second heat-sensitive layer 422 is formed as a film by coating the bottom surface of the second heat-insulating layer 432 with a chemical agent. The second heat-sensitive layer 422 produces a second color when heated above a second temperature. The second temperature is higher than the first temperature. In the present embodiment, the second color is magenta.

The third heat-sensitive layer 423 is formed as a film by coating the top surface of the second heat-insulating layer 432 with a chemical agent. The third heat-sensitive layer 423 produces a third color when heated above a third temperature. The third temperature is higher than the second temperature. In the present embodiment, the third color is yellow.

The heat-insulating layers 43 are sheet-like layers. Owing to their low thermal conductivity, the heat-insulating layers 43 function as resistance to heat conduction. Accordingly, a temperature gradient along a direction of heat transfer is produced within each of the heat-insulating layers 43. As will be described later, when the thermal head 10 applies heat to the heat-sensitive tape 4 from the top side in FIGS. 4A-4C, the temperature on the bottom surface of each layer of the heat-insulating layers 43 will be lower than the temperature on the top surface of the corresponding layer of the heat-insulating layers 43. In this way, each layer in the heat-insulating layers 43 can produce a desired difference in temperature between the two layers of the heat-sensitive layers 42 neighboring the corresponding layer in the heat-insulating layers 43 on the top and bottom sides thereof according to the thermal conductivity of each layer in the heat-insulating layers 43.

Specifically, the second heat-insulating layer 432 can produce a lower temperature in the second heat-sensitive layer 422 than the temperature in the third heat-sensitive layer 423. Similarly, the first heat-insulating layer 431 can produce a lower temperature in the first heat-sensitive layer 421 than the temperature in the second heat-sensitive layer 422. In this way, the heat-sensitive tape 4 can be configured to use the effect of the heat-insulating layers 43 to deliberately control the temperature of the first heat-sensitive layer 421 at a temperature higher than the first temperature and lower than the second temperature, the temperature of the second heat-sensitive layer 422 at a temperature higher than the second temperature and lower than the third temperature, and the temperature of the third heat-sensitive layer 423 at a temperature higher than the third temperature.

The overcoat layer 44 is formed as a film by coating the top surface of the third heat-sensitive layer 423. The overcoat layer 44 can transmit more blue visible light (light having a wavelength of about 470 nm, for example) than yellow visible light (light having a wavelength of about 580 nm, for example). Thus, the overcoat layer 44 has lower visible light transmittance for yellow than visible light transmittance for blue The overcoat layer 44 protects the heat-sensitive layers 42 on the opposite side of the heat-sensitive tape 4 from the base material 41 (i.e., the top surface of the heat-sensitive tape 4).

Overall, the heat-sensitive tape 4 has visible light transmittance in the thickness direction of the heat-sensitive tape 4. In other words, all layers of the heat-sensitive tape 4 have visible light transmittance. The visible light transmittance (%) of the base material 41 may be the same as the visible light transmittance of at least one of the heat-sensitive layers 42, heat-insulating layers 43, and overcoat layer 44; or may differ from the visible light transmittance of all these layers. The visible light transmittance for each layer of the heat-sensitive tape 4 is at least 90%, for example, and preferably at least 99%, and more preferably at least 99.9%. Even if less than 90%, the visible light transmittance for each layer should be at least sufficiently high for the user to visualize colors produced in the heat-sensitive layers 42 through the base material 41. The layers of the heat-sensitive tape 4 may be transparent or translucent, but are preferably transparent.

The ultraviolet light transmittance (%) of the base material 41 is lower than that of the first heat-insulating layer 431, and specifically lower than the ultraviolet light transmittance of any layer in the heat-insulating layers 43.

The thermal conductivity of the base material 41 is lower than the thermal conductivity of the first heat-insulating layer 431, and specifically lower than the thermal conductivity of any layer in the heat-insulating layers 43. Thermal conductivity (W/K) of a layer is a product of the thermal conductivity of the layer material (W/(m·K)) and the layer thickness (m).

The base material 41 has a refractive index that is higher than that of the first heat-insulating layer 431, and specifically higher than the refractive index of any layer in the heat-insulating layers 43.

The base material 41 has a thickness that is greater than a thickness of the first heat-insulating layer 431, and specifically greater than the thickness of any layer in the heat-insulating layers 43. The thickness of a layer corresponds to a vertical dimension of the layer in FIG. 4A. In FIG. 4A, the thickness for each layer of the heat-sensitive tape 4 and the relationship among magnitudes of thicknesses of the layers are depicted schematically to facilitate understanding, though the actual layer thicknesses and relationships among these thicknesses may differ from those given in FIG. 4A (this also applies to FIGS. 4B, 5A, 5B, 8A and 8B) For example, the thickness of the overcoat layer 44 may be greater than the thickness of each of the heat-sensitive layers 42, or may be the same or smaller than the thickness of each of the heat-sensitive layers 42.

<Structure of the Adhesive Tape 7>

Figure 4B:
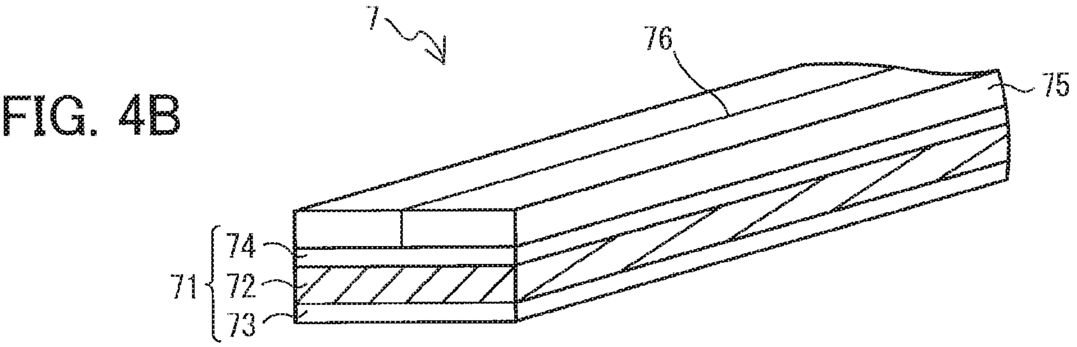
FIG. 4B is a perspective view illustrating layers of an adhesive tape 7 accommodated in the tape cassette 30.

As shown in FIG. 4B, the adhesive tape 7 is a long strip-like recording medium and is configured of a plurality of laminated layers. Specifically, the adhesive tape 7 includes a double-sided adhesive tape 71, and the release paper 75. The double-sided adhesive tape 71 is white in color. The double-sided adhesive tape 71 has a sheet 72, the first adhesive layer 73, and the second adhesive layer 74. The sheet 72 is white in color. In FIG. 4B, the sheet 72 (the double-sided adhesive tape 71) is filled with oblique lines to represent the color white (this also applies to FIGS. 4B, 5B, and 8B). In the present embodiment, the visible light transmittance of the sheet 72 is lower than the visible light transmittance of each layer in the heat-sensitive tape 4.

The first adhesive layer 73 is provided on a bottom surface of the sheet 72, and the second adhesive layer 74 is provided on a top surface of the sheet 72. That is, the double-sided adhesive tape 71 is configured by applying adhesive to both top and bottom surfaces of the sheet 72.

The release paper 75 is bonded to the double-sided adhesive tape 71 through the second adhesive layer 74. A score line 76 is formed in the release paper 75. The score line 76 extends in a longitudinal direction of the adhesive tape 7 and divides the release paper 75 in two in a lateral direction thereof. The score line 76 does not penetrate into the double-sided adhesive tape 71, and, hence, does not reach the first adhesive layer 73 opposite the release paper 75. The sheet 72 is formed continuously across the score line 76 and, thus, the double-sided adhesive tape 71 is formed continuously across the score line 76. In other words, a portion of the adhesive tape 7 is cut in a thickness direction thereof <Structure of the Laminated Tape 9>

Figure 4C:
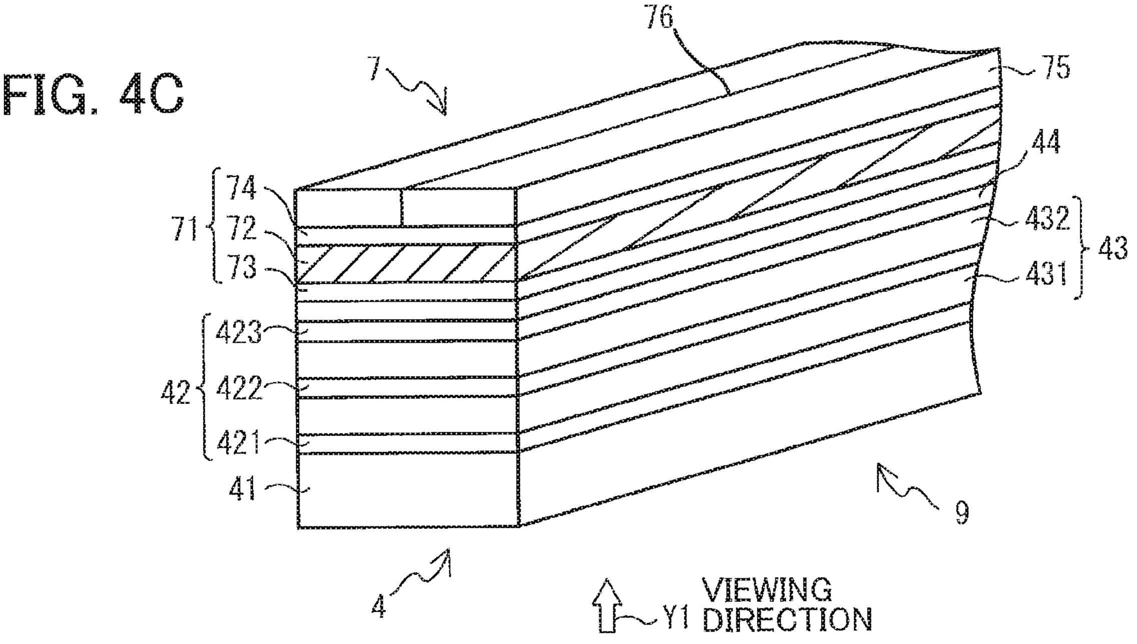
FIG. 4C is a perspective view illustrating layers of a laminated tape 9 configured of the heat-sensitive tape 4 and adhesive tape 7.

As shown in FIG. 4C, the laminated tape 9 is configured by bonding the bottom surface of the adhesive tape 7 to the top surface of the printed, heat-sensitive tape 4. Accordingly, the laminated tape 9 includes the base material 41, first heat-sensitive layer 421, first heat-insulating layer 431, second heat-sensitive layer 422, second heat-insulating layer 432, third heat-sensitive layer 423, overcoat layer 44, first adhesive layer 73, sheet 72, second adhesive layer 74, and release paper 75 that are stacked in the thickness direction in the order given.

The user views the laminated tape 9 from the base material 41 side (i.e., the bottom side of the laminated tape 9), as indicated by a viewing direction Y1 in FIG. 4C. Since the heat-sensitive tape 4 has visible light transmittance as a whole, the user can see developed colors (i.e., printed images) in each of the heat-sensitive layers 42 through the base material 41 and the appearance of the adhesive tape 7 as a background when viewing the laminated tape 9 from the base material 41 side. Since the double-sided adhesive tape 71 is white in the present embodiment, the background of the laminated tape 9 appears white when the user views the laminated tape 9 from the base material 41 side. The user uses the laminated tape 9 by peeling the release paper 75 off the double-sided adhesive tape 71 and affixing the laminated tape 9 to a given wall, mount, or the like.

Note that the user cannot see developed colors (i.e., the printed images) in the heat-sensitive layers 42 from the adhesive tape 7 side (the top surface side of the laminated tape 9), even after peeling the release paper 75 off the double-sided adhesive tape 71, because the double-sided adhesive tape 71 is present on top of the heat-sensitive layers 42.

<Conveying Paths for the Heat-Sensitive Tape 4 and Adhesive Tape 7>

As shown in FIG. 3, the heat-sensitive tape 4 is drawn frontward off the right side of the first supply roll 40, and then turned leftward in a right-front corner portion of the cassette case 31. The heat-sensitive tape 4 passes through the inside of the arm part 34 and subsequently exits the cassette case 31 through the opening 341.

Figure 5A:
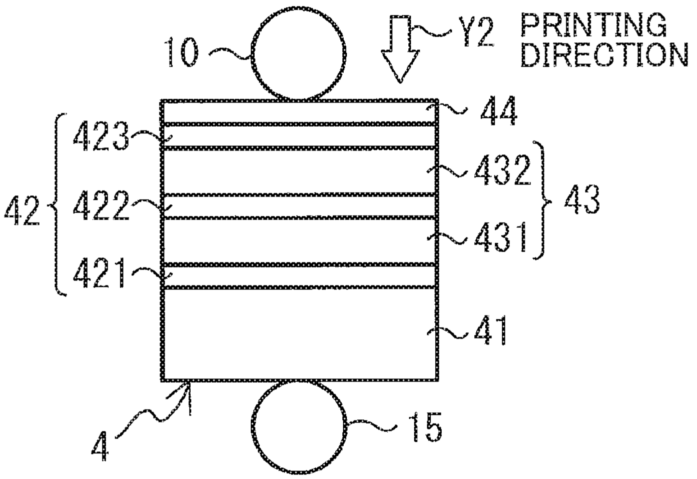
FIG. 5A is a plan view for describing printing on the heat-sensitive tape 4 in the thermal printer 1 according to the embodiment.

While in the head opening 391, the side of the heat-sensitive tape 4 having the heat-sensitive layers 42 (the top side of the heat-sensitive tape 4) opposes the thermal head 10 while the base material 41 side of the heat-sensitive tape 4 (the bottom side of the heat-sensitive tape 4) opposes the platen roller 15, as illustrated in FIG. 5A. Thus, while the tape cassette 30 is mounted in the cassette attachment portion 8, the thermal head 10 is positioned opposite the base material 41 with respect to the heat-sensitive layers 42 (i.e., the rear side of the heat-sensitive tape 4). Accordingly, the thermal head 10 can heat the heat-sensitive tape 4 in the head opening 391 on the opposite side of the heat-sensitive tape 4 from the base material 41 (see a printing direction Y2).

Figure 5B:
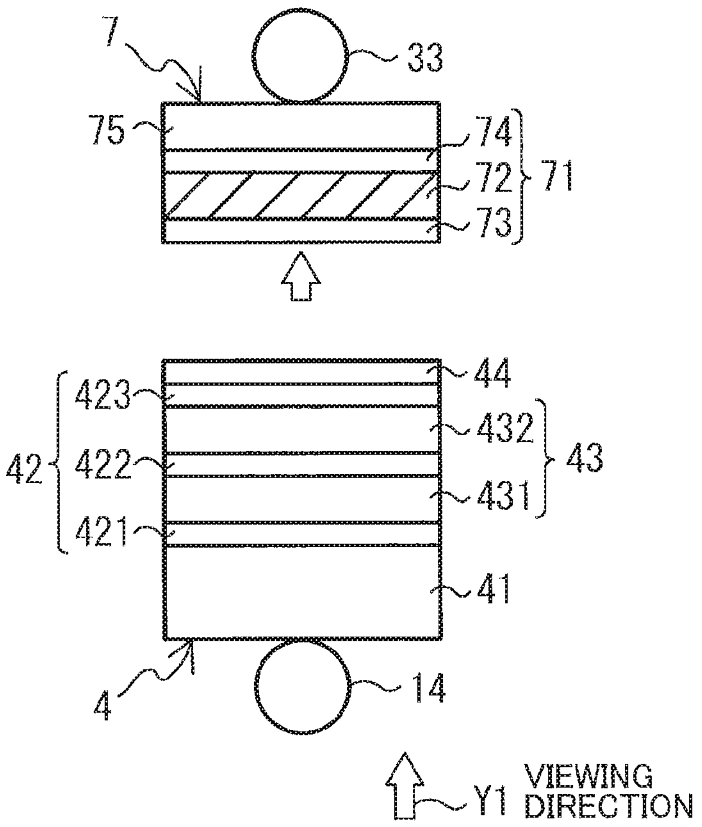
FIG. 5B is a plan view for describing bonding of the adhesive tape 7 to the printed heat-sensitive tape 4 in the thermal printer 1 according to the embodiment.

As shown in FIG. 3, the heat-sensitive tape 4 passes through the head opening 391 and between the conveying roller 33 and pinch roller 14. At this time, the heat-sensitive layers 42 side of the heat-sensitive tape 4 opposes the conveying roller 33, while the base material 41 side of the heat-sensitive tape 4 opposes the pinch roller 14, as illustrated in FIG. 5B.

As shown in FIG. 3, the adhesive tape 7 is pulled frontward from the left side of the second supply roll 70. The adhesive tape 7 then curves leftward while in contact with a right-front circumferential portion of the conveying roller 33. At this time, the release paper 75 side of the adhesive tape 7 (the top side of the adhesive tape 7) opposes the conveying roller 33 while the double-sided adhesive tape 71 side (the bottom side of the adhesive tape 7) opposes the pinch roller 14, as illustrated in FIG. 5B. Accordingly, with the adhesive tape 7 overlapping the heat-sensitive tape 4 on the opposite side of the heat-sensitive layers 42 from the base material 41, the conveying roller 33 supports the adhesive tape 7 from the opposite side of the heat-sensitive tape 4.

With the heat-sensitive tape 4 and adhesive tape 7 superimposed, the heat-sensitive tape 4 and adhesive tape 7 are bonded together between the pinch roller 14 and conveying roller 33, thereby forming the laminated tape 9. As shown in FIG. 3, the laminated tape 9 is discharged from the tape cassette 30 after passing through the interior of the guide part 38. The laminated tape 9 is conveyed to a prescribed position relative to the cutting mechanism 16, and the cutting mechanism 16 cuts the laminated tape 9. Once cut, the laminated tape 9 is discharged from the thermal printer 1 through the discharge slit formed in the device body 2.

<Electrical Structure of the Thermal Printer 1>

Figure 6:
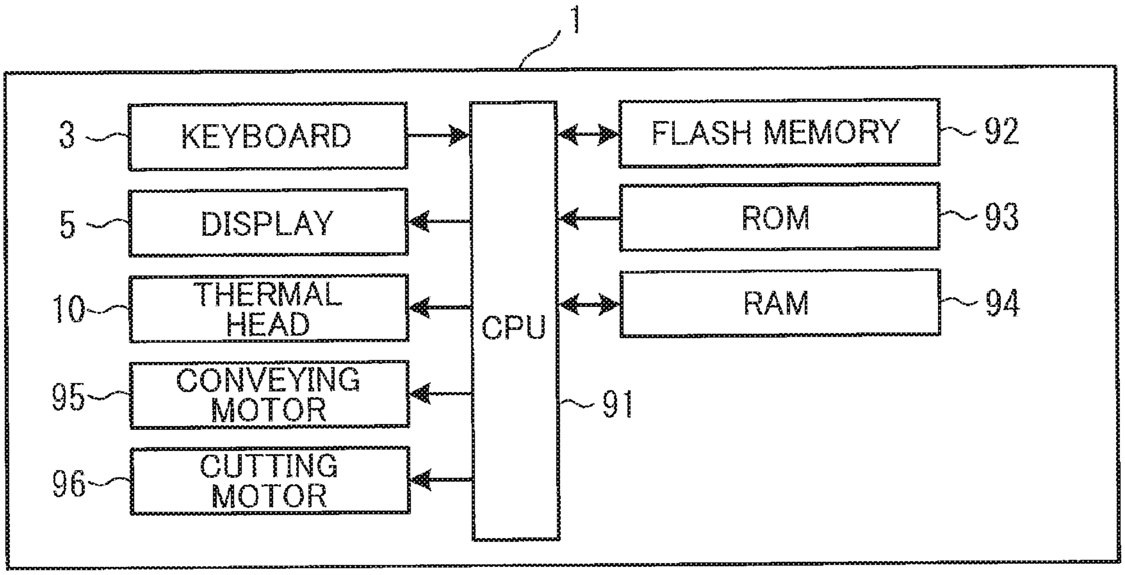
FIG. 6 is a block diagram illustrating an electrical configuration of the thermal printer 1 of the embodiment.

As shown in FIG. 6, the thermal printer 1 further includes a CPU 91. The CPU 91 functions as a processor for controlling the thermal printer 1. The CPU 91 is electrically connected to a flash memory 92, a ROM 93, and a RAM 94, as well as the keyboard 3, display 5, thermal head 10, conveying motor 95, and cutting motor 96 described earlier.

The flash memory 92 stores programs executed by the CPU 91, and the like. The ROM 93 stores various parameters required for executing the various programs. The RAM 94 stores various temporary data, such as print data used for forming images.

<Process for Creating Laminated Tape in the Thermal Printer 1>

The user inputs a print start command into the thermal printer 1 by operating the keyboard 3. Upon acquiring the print start command, the CPU 91 reads a program from the flash memory 92 and executes a laminated tape creation process illustrated in FIG. 7. In the laminated tape creation process, the CPU 91 controls the thermal printer 1 to perform printing operations in order to create the laminated tape 9.

Figure 7:
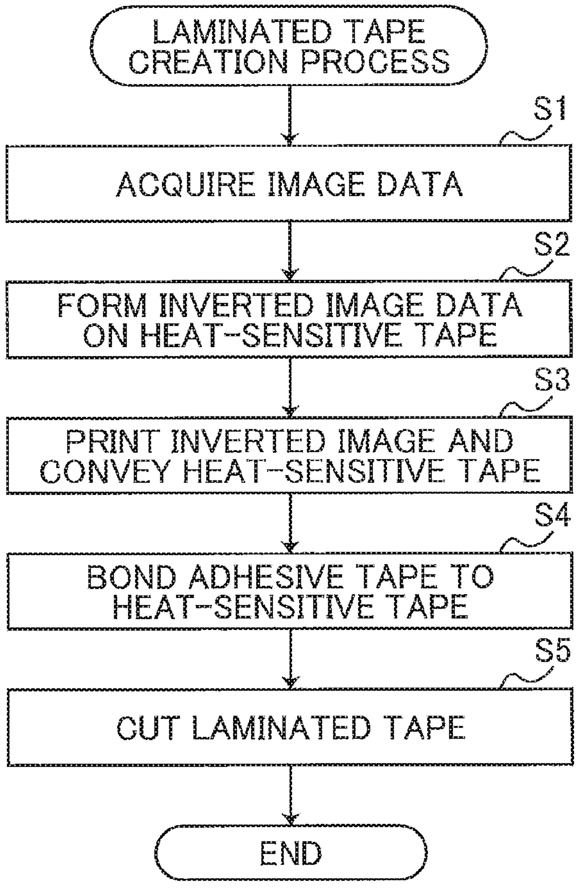
FIG. 7 is a flowchart explaining steps of a laminated tape creation process to be performed in the thermal printer 1 according to the embodiment.

Referring to FIG. 7, in S1, the CPU 91 acquires image data representing an image specified by the user. The user specifies the image to be formed on the laminated tape 9 in advance on the keyboard 3. The image to be formed on the laminated tape 9 is an image that can be seen by a user looking at the laminated tape 9 in the viewing direction Y1. Below, a case in which the user has specified an image of "q" will be described as an example.

Figure 8A:
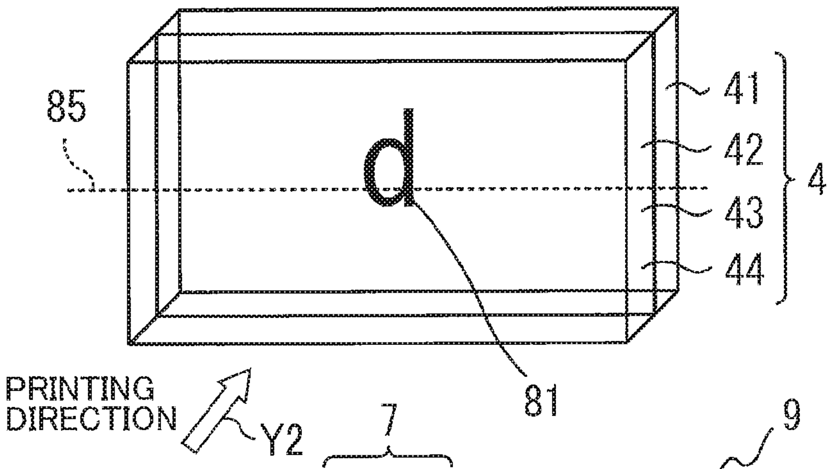
FIG. 8A is a perspective view for description of how an inverted image 81 is seen during printing onto the heat-sensitive tape 4 in the thermal printer 1 according to the embodiment.

In S2, the CPU 91 creates image data representing an inverted image by inverting the acquired image data. Inversion is a process of flipping the content of an image about a horizontal axis. In the example of FIG. 8A, a horizontal line 85 extending in the longitudinal direction of the heat-sensitive tape 4 and passing through the lateral center of the same serves as the axis of rotation, and the image content is flipped about the line 85 when the image is viewed in the printing direction Y2. More specifically, when the image of "q" has been specified, the CPU 91 inverts the image of "q" to create image data representing "d" (hereinafter called an inverted image 81), as illustrated in FIG. 8A.

In S3, the CPU 91 performs print control based on the image data created in S2 for the inverted image. The CPU 91 controls the conveying motor 95 to rotate the drive shaft 18. As the drive shaft 18 is driven to rotate, the heat-sensitive tape 4 is pulled off the first supply roll 40 and the adhesive tape 7 is pulled off the second supply roll 70 through the cooperative operations of the conveying roller 33 and pinch roller 14.

While continuing to control the conveying motor 95, the CPU 91 further controls the thermal head 10. Specifically, while conveying the heat-sensitive tape 4, the CPU 91 selectively heats the heating elements 11 so that the inverted image created in S2 is formed in die heat-sensitive layers 42. At this time, the thermal head 10 heats the heat-sensitive tape 4 on the side of the heat-sensitive layers 42 opposite the base material 41, as described above, thereby printing the inverted image on the heat-sensitive tape 4.

As shown in FIG. 8A, the inverted image 81 is formed in the heat-sensitive layers 42 when the user has specified the image "q". When viewed in the printing direction Y2, the inverted image 81 represents "d".

In S4, the CPU 91 performs control to bond the adhesive tape 7 to the printed heat-sensitive tape 4. Specifically, by controlling the conveying motor 95 to rotate the drive shaft 18, the CPU 91 conveys the printed heat-sensitive tape 4 and adhesive tape 7 between the conveying roller 33 and pinch roller 14 so that the adhesive tape 7 is bonded to the printed heat-sensitive tape 4 on the side of the heat-sensitive layers 42 opposite the base material 41, thereby creating the laminated tape 9. In S5, the CPU 91 controls the cutting motor 96 to drive the cutting mechanism 16 to cut the laminated tape 9. This completes the laminated tape creation process.

Figure 8B:
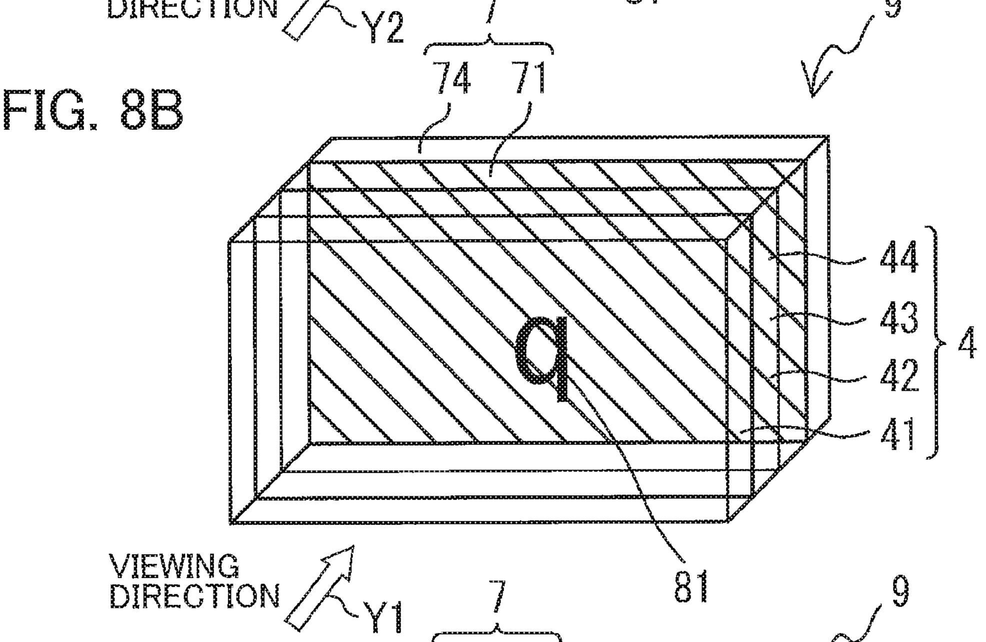
FIG. 8B is a perspective view for description of how the inverted image 81 is seen upon completion of the laminated tape 9 in the thermal printer 1 according to the embodiment.

As shown in FIG. 8B, the viewing direction Y1 and printing direction Y2 are opposite directions relative to the heat-sensitive tape 4. Accordingly, when the user views the laminated tape 9 from the base material 41 side (i.e., in the viewing direction Y1), the inverted image 81 represents the image "q". Hence, the thermal printer 1 has produced the laminated tape 9 having the image "q" that was specified by the user.

<Principal Technical Advantages of the Embodiment>

The thermal printer 1 according to the present embodiment can create the laminated tape 9 from the heat-sensitive tape 4 and adhesive tape 7 by executing at least the process in S3 and S4. Since the base material 41 has visible light transmittance, the user can see colors developed in the heat-sensitive layers 42 through the base material 41. Hence, colors developed in the heat-sensitive tape 4 are exposed more on the side of the base material 41 than on the side opposite the base material 41. In the present embodiment, the base material 41 can protect the heat-sensitive layers 42. Since the adhesive tape 7 is bonded to the opposite side of the heat-sensitive layers 42 from the base material 41, the heat-sensitive layers 42 are arranged between the base material 41 and adhesive tape 7 in the thickness direction of the heat-sensitive tape 4. Accordingly, the base material 41 and adhesive tape 7 of the embodiment can protect the heat-sensitive layers 42 from changes in such ambient conditions as moisture, light, and temperature, and from friction and the like, thereby suppressing deterioration over time in the image formed on the laminated tape 9.

Figure 9:
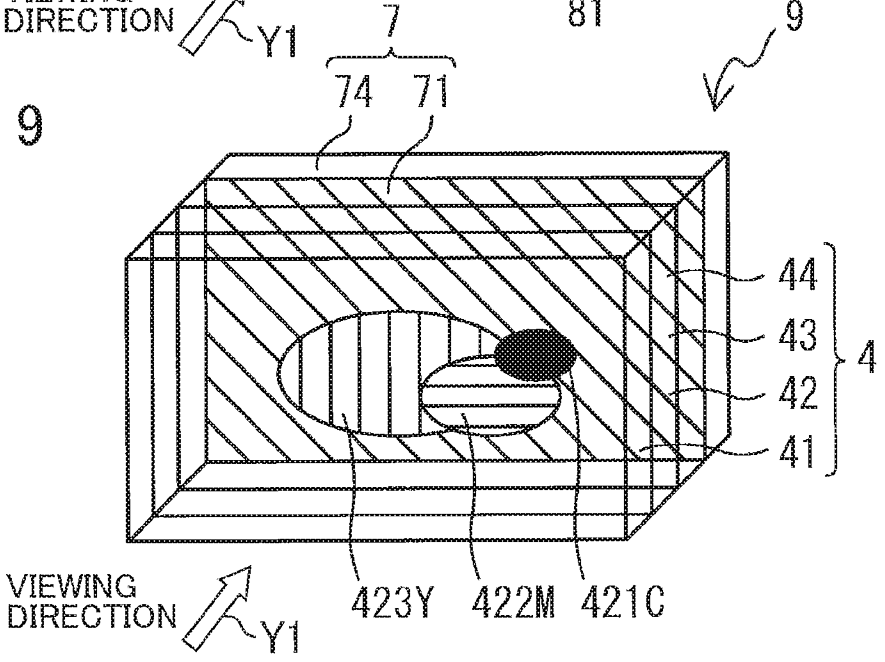
FIG. 9 is a perspective view for description of overlapping among coloring regions in respective layers of the heat-sensitive layers 42 of the heat-sensitive tape 4.

In FIG. 9, a coloring region 421C in the first heat-sensitive layer 421 (i.e., the layer for developing the first color, which is cyan in the present embodiment) is filled in black; a coloring region 422M in the second heat-sensitive layer 422 (i.e., the layer for developing the second color, which is magenta in the present embodiment) is filled with horizontal lines; and a coloring region 423Y in the third heat-sensitive layer 423 (i.e., the layer for developing the third color, which is yellow in the present embodiment) is filled with vertical lines. Note that depictions of the first heat-sensitive layer 421, second heat-sensitive layer 422, and third heat-sensitive layer 423 have been omitted in FIG. 9.

In the present embodiment, a plurality of colors can be rendered by combining the first color, second color, and third color. With the heat-sensitive tape 4 of the embodiment, the thermal printer 1 can selectively develop colors in the third heat-sensitive layer 423 having a high color-developing temperature, the second heat-sensitive layer 422 having a lower color-developing temperature than the third heat-sensitive layer 423, and the first heat-sensitive layer 421 having a lower color-developing temperature than the second heat-sensitive layer 422 by heating the heat-sensitive tape 4 on the opposite side of the heat-sensitive tape 4 from the base material 41.

Heat inputted into the heat-sensitive tape 4 from the heat source (the thermal head 10) diffuses as the distance from the thermal head 10 increases. Therefore, when a single heating element 11 generates heat, the coloring region in each of the heat-sensitive layers 42 tends to become smaller the further away from the thermal head 10. In the present embodiment, the distance from the thermal head 10 increases in an order to the third heat-sensitive layer 423, second heat-sensitive layer 422, and first heat-sensitive layer 421. Accordingly, the coloring region in each of the heat-sensitive layers 42 when a single heating element 11 is heated becomes gradually smaller in an order of the coloring region 423Y in the third heat-sensitive layer 423, the coloring region 422M in the second heat-sensitive layer 422, and the coloring region 4210 in the first heat-sensitive layer 421.

When the coloring regions in the heat-sensitive layers 42 overlap one another, the coloring region in the layer nearest the user viewing the laminated tape 9 from the heat-sensitive tape 4 side (in the viewing direction Y1) appears to cover the coloring regions in the layers farther away from the user. In the present embodiment, the coloring region 421C of the first heat-sensitive layer 421 is closest to the user while the coloring region 423Y of the third heat-sensitive layer 423 is farthest away. Thus, when the user observes the laminated tape 9 from the heat-sensitive tape 4 side, the coloring region 421 of the first heat-sensitive layer 421 is never covered by the coloring region 422M in the second heat-sensitive layer 422 or the coloring region 423Y in the third heat-sensitive layer 423, and the coloring region 422M in the second heat-sensitive layer 422 is never covered by the coloring region 423Y in the third heat-sensitive layer 423.

The smaller the coloring region for a single color, the broader the range of colors that can be reproduced per unit area. Here, an example of reproducing green by developing cyan and yellow in the same area will be described. In the following description, a region that the user can see when viewing the coloring region, i.e., the region not covered by other coloring regions, will be called an "exposed region."

If the viewing direction were the same as the printing direction Y2, i.e., if the user were viewing the heat-sensitive tape 4 from the opposite side of the base material 41, the yellow coloring region 423Y would cover the cyan coloring region 421C. Since the exposed region of the cyan coloring region 421C covers the same area as the exposed region of the yellow coloring region 423Y in this example, the thermal printer 1 would have to print cyan a plurality of times in order that the area of the cyan coloring region 421C becomes larger than the area of the yellow coloring region 423Y. That is, in order to reproduce green for the user, the exposed region of the cyan coloring region 421C needs to be provided around the larger exposed region of the coloring region 423Y.

However, since the user views the laminated tape 9 in the viewing direction Y1 in the present embodiment, the cyan coloring region 421C covers the yellow coloring region 423Y. Hence, since the exposed region of the cyan coloring region 421C has the same area as the exposed region of the yellow coloring region 423Y in this case, the thermal printer 1 may print cyan a plurality of times so that the cyan coloring region 421C is superimposed over the yellow coloring region 423Y and the area of the cyan coloring region 421C is smaller than the area of the yellow coloring region 423Y. That is, the exposed region of the cyan coloring region 421C is not covered by the exposed region of the yellow coloring region 423Y and is thus visible within the larger exposed region of the yellow coloring region 423Y.

As a result, the minimum area required for reproducing green is smaller in the present embodiment (i.e., When the viewing direction Y1 and printing direction Y2 are opposite relative to the heat-sensitive tape 4) than when the viewing direction is the same as the printing direction Y2. Since the range of reproducible colors is greater when a larger number of colors can be reproduced per unit area, the configuration of the present embodiment can expand the range of reproducible colors over the reproducible range when the viewing direction is the same as the printing direction Y2.

Owing to the reasons described above (sizes and overlapping conditions of the coloring regions), the configuration of the present embodiment enhances the degree of freedom in the size of the coloring region in each of the heat-sensitive layers 42 that is visible to the user (i.e., the size of the exposed region). Accordingly, the configuration of the present embodiment can expand the range of reproducible colors while protecting the heat-sensitive layers 42.

As described above, the first color is cyan, the second color magenta, and the third color yellow. In other words, the first heat-sensitive layer 421, second heat-sensitive layer 422, and third heat-sensitive layer 423 produce the three primary colors. Accordingly, the configuration of the present embodiment can reproduce more colors (display colors) by combining the three primary colors.

The adhesive tape 7 is configured of the double-sided adhesive tape 71 and the release paper 75. Accordingly, the user can more easily handle the laminated tape 9 than if the double-sided adhesive tape 71 were exposed.

The score line 76 is formed in the release paper 75, and the double-sided adhesive tape 71 extends continuously across the score line 76 in the thickness direction. Hence, the adhesive tape 7 is in a half-cut state, whereby the release paper 75 is cut but the double-sided adhesive tape 71 remains uncut, enabling the user to easily peel the release paper 75 from the double-sided adhesive tape 71.

If the adhesive tape 7 were bonded to the heat-sensitive tape 4 in advance (i.e., prior to printing) and the thermal printer 1 were to print on the heat-sensitive tape 4 while the adhesive tape 7 was bonded thereto, the score line 76 may cause unevenness in the heat conveyed from the thermal head 10. For example, contact pressure applied by the thermal head 10 against the heat-sensitive tape 4 may be lower in the region of the score line 76, causing the coefficient of heat transfer in the region of the score line 76 to be lower than the coefficient of heat transfer in regions around the score line 76. In such cases, printing quality may worsen. Specifically, the color developed along the score line 76 may be fainter, resulting in the occurrence of an effect known as "White line."

In the present embodiment, the adhesive tape 7 is bonded to the heat-sensitive tape 4 after the heat-sensitive tape 4 has been printed. That is, the adhesive tape 7 is not laminated on the heat-sensitive tape 4 in advance. Accordingly, the printing quality in the present embodiment is not degraded by the score line 76, and the present embodiment can provide the user with the laminated tape 9 that is convenient to handle.

Further, the double-sided adhesive tape 71 in the embodiment is White. Accordingly, the user viewing the laminated tape 9 from the heat-sensitive tape 4 side can see a white background. Hence, the thermal printer 1 of the embodiment can reproduce a wide range of colors that include the first color, second color, third color, and combinations of these colors.

The overcoat layer 44 transmits more blue visible light than yellow visible light. Accordingly, through the white adhesive tape 7 and the overcoat layer 44, the present embodiment can provide the user with the laminated tape 9 having a blue-tinged white background. Color in indoor lighting and the like is not perfectly white, but may be warm white or daylight color that tends to be slightly yellowish. In such cases, a printed color image observed by the user indoors may appear slightly more yellowish than a color that the user specified when viewing a computer display or the like. When the background is a blue-tinged white, the yellow and blue cancel each other out owing to their complementary relationship. In this way, the present embodiment enables the user to see colors in the laminated tape 9 close to the intended colors.

The base material 41 is configured of a resin film. Therefore, the tape cassette 30 can protect the heat-sensitive layers 42 with resin film. Most materials used in resin types have a higher waterproofing property than paper, for example. Hence, a material having an excellent waterproofing property can be selected from among the types of resins in the present embodiment as the material for the base material 41. In this way, the present embodiment can easily protect the heat-sensitive layers 42 from moisture.

More specifically, the base material 41 is configured of PET film. Therefore, the present invention can protect the heat-sensitive layers 42 with PET film. Since PET film has a greater waterproofing property than paper, Mr example, the heat-sensitive layers 42 can be protected from moisture in the present embodiment.

Further, the base material 41 has lower thermal conductivity than the first heat-insulating layer 431. Therefore, heat inputted into the heat-sensitive tape 4 from the heat-sensitive layer 42 side when printing with the thermal printer 1 is less likely to be diffused in the base material 41. Accordingly, the present embodiment can reduce the amount of heat inputted into the heat-sensitive tape 4 that is required to develop colors in the heat-sensitive layers 42. When the adhesive tape 7 is bonded to the heat-sensitive tape 4 after the heat-sensitive tape 4 is printed by the thermal printer 1, the base material 41 functions as a laminate member for protecting the heat-sensitive layers 42. Since the base material 41 has lower thermal conductivity than the first heat-insulating layer 431, the base material 41 can prevent unintended discoloring in the heat-sensitive layers 42 due to heat inputted through the base material 41 side.

Further, the base material 41 is thicker than the first heat-insulating layer 431. Hence, the configuration of the present embodiment can lower the thermal conductivity of the base material 41. After printing is performed with the thermal printer 1, the base material 41 functions as a laminate member for protecting the heat-sensitive layers 42. By making the thermal conductivity of the base material 41 lower, the base material 41 can better prevent unnecessary discoloration in the heat-sensitive layers 42 due to heat inputted into the heat-sensitive tape 4 from the base material 41 side than if the base material 41 were formed of material having high thermal conductivity. In other words, use of the thick base material 41 in the present embodiment can prevent unintended discoloration in the heat-sensitive layers 42 without using a special material in the base material 41 to reduce thermal conductivity.

The base material. 41 also has lower ultraviolet light transmittance than the first heat-insulating layer 431. Accordingly, the base material 41 can prevent ultraviolet light from altering the nature of the heat-sensitive layers 42, heat-insulating layers 43, and adhesive tape 7 (in particular, the first adhesive layer 73).

The base material 41 has a higher index of refraction than the first heat-insulating layer 431. Therefore, the light incident on the base material 41 side of the heat-sensitive tape 4 tends to be completely reflected by the interface between the base material 41 and the first heat-insulating layer 431. Accordingly, the present invention can provide the user with the glossy laminated tape 9.

The first supply roll 40 is configured by winding the heat-sensitive tape 4 about the first tape spool 21. Thus, the present invention can provide a larger quantity of heat-sensitive tape 4 in the tape cassette 30 than if the heat-sensitive tape 4 were unwound. In other words, the present embodiment can make the cassette case 31 more compact.

The first supply roll 40 is formed by winding the heat-sensitive tape 4 so that the heat-sensitive layers 42 are on the inside of the base material 41. Accordingly, the base material 41 can more easily protect the heat-sensitive layers 42 in the present embodiment than if the heat-sensitive tape 4 were wound such that the heat-sensitive layers 42 faced outward.

The second supply roll 70 is configured by winding the adhesive tape 7 about the second tape spool 22, Accordingly, a larger quantity of adhesive tape 7 can be accommodated in the tape cassette 30 than if the adhesive tape 7 were unwound. In other words, the present embodiment can make the cassette ease 31 more compact.

The second supply roll 70 is configured by winding the adhesive tape 7 so that the first adhesive layer 73 is on the inside of the release paper 75. Thus, the first adhesive layer 73 can be more easily protected from dust deposits, drying, and the like in the present embodiment than if the adhesive tape 7 were wound with the first adhesive layer 73 facing outward. When the user views the laminated tape 9 from the heat-sensitive tape 4 side, the first adhesive layer 73 side of the adhesive tape 7 forms the background. Hence, the tape cassette 30 can present a beautiful background.

With the adhesive tape 7 overlapping the heat-sensitive tape 4 on the opposite side of the heat-sensitive layers 42 from the base material 41, the conveying roller 33 supports the adhesive tape 7 on the opposite side of the adhesive tape 7 from the heat sensitive tape 4. Accordingly, the present embodiment can easily bond the heat-sensitive tape 4 and adhesive tape 7 together at the position of the conveying roller 33.

The conveying roller 33 is rotatably supported in the cassette case 31. Thus, this configuration can suppress friction between the conveying roller 33 and the adhesive tape 7, thereby suppressing the conveying roller 33 from hindering conveyance of the adhesive tape 7.

The CPU 91 performs control for selectively heating the heating elements 11 in order to form an inverted image on the heat-sensitive tape 4. When the user views the laminated tape 9 from the heat-sensitive tape 4 side, the inverted image formed in this way appears as the original image. Accordingly, by inverting the image to be formed on the heat-sensitive tape 4, the thermal printer 1 can create the laminated tape 9 having the user's desired image printed thereon.

<Variations and Modifications>

Next, various modifications of the embodiment will be described, wherein like parts and components having the same functions as those in the depicted embodiment are designated with the same reference numerals and descriptions of these parts and components are omitted or simplified.

1. First Modification

Figure 10:
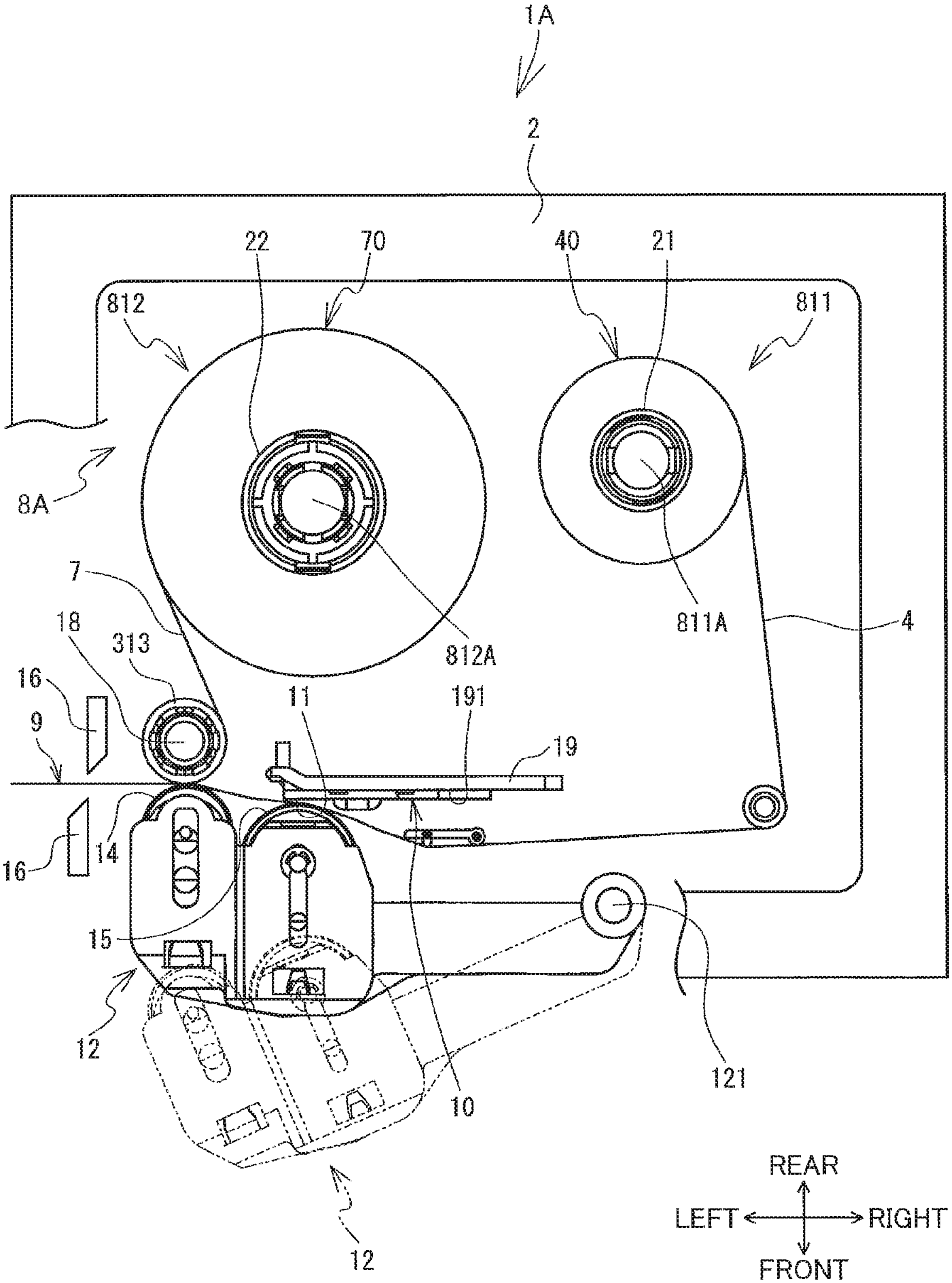
FIG. 10 is a plan view of a cassette attachment portion 8A of a thermal printer 1A according to a first modification to the embodiment.

FIG. 10 shows a printing system according to a first modification to the embodiment. The first modification is different from the depicted embodiment in that the cassette case 31 of the tape cassette 30 is not provided. Specifically, a thermal printer 1A according to the first modification uses the same heat-sensitive tape 4 and adhesive tape 7 of the embodiment. The thermal printer 1A of the first modification is identical to the thermal printer 1 of the embodiment, except for the structure of the cassette attachment portion 8. In the first modification, the same control (the laminated tape creation process) as that used in the embodiment is employed.

The thermal printer tA includes a cassette attachment portion 8A, in place of the cassette attachment portion 8 of the embodiment. The cassette attachment portion 8A includes a first attachment portion 811, and a second attachment portion 812. The first attachment portion 811 constitutes a right-rear section of the cassette attachment portion 8A. A support shaft 811A is provided in the first attachment portion 811. The support shaft 811A extends vertically and is inserted into the first tape spool 21. The support shaft 811A rotatably supports the first tape spool 21. Thus, the first supply roll 40 is detachably mounted in the first attachment portion 811.

The second attachment portion 812 is positioned in a left-rear section of the cassette attachment portion 8A, i.e., on the left side of the first attachment portion 811. A support shaft 812A is provided in the second attachment portion 812. The support shaft 812A extends vertically and is inserted into the second tape spool 22. The support shaft 812A rotatably supports the second tape spool 22. Thus, the second supply roll 70 is detachably mounted in the second attachment portion 812.

A conveying roller 313 is provided downstream (on the left side) of the thermal head 10 in the conveying direction. The conveying roller 313 is cylindrical in shape and is mounted on the drive shaft 18. The drive shaft 18 is configured to drive the conveying roller 313 to rotate. The pinch roller 14 can contact and separate from the conveying roller 313 along with the pivotal movement of the platen holder 12. In the printing position of the platen holder 12, the pinch roller 14 presses the heat-sensitive tape 4 and adhesive tape 7 against the conveying roller 313 so that the heat-sensitive tape 4 and adhesive tape 7 are overlapped with each other.

The heat-sensitive tape 4 is drawn frontward off the right side of the first supply roll 40, and then turned leftward at a right-front corner portion of the cassette attachment portion 8A. The heat-sensitive tape 4 passes along the front side of the head holder 19. On the front side of the head holder 19, the heat-sensitive layer 42 side of the heat-sensitive tape 4 opposes the thermal head 10 while the base material 41 side of the heat-sensitive tape 4 opposes the platen roller 15. Thus, the thermal head 10 is positioned on the opposite side of the heat-sensitive layers 42 from the base material 41 (i.e., the rear side of the heat-sensitive tape 4). Accordingly, the thermal head 10 can heat the heat-sensitive tape 4 from the opposite side of the base material 41.

The heat-sensitive tape 4 passes between the conveying roller 313 and pinch roller 14 after passing along the front side of the head holder 19. At this time, the heat-sensitive layer 42 side of the heat-sensitive tape 4 opposes the conveying roller 313 while the base material 41 side of the heat-sensitive tape 4 opposes the pinch roller 14.

The adhesive tape 7 is pulled frontward from the left side of the second supply roll 70. The adhesive tape 7 then curves leftward while in contact with a right-front circumferential portion of the conveying roller 313. At this time, the release paper 75 side of the adhesive tape 7 opposes the conveying roller 313, while the double-sided adhesive tape 71 side opposes the pinch roller 14. Accordingly, with the adhesive tape 7 overlapping the heat-sensitive tape 4 on the opposite side of the heat-sensitive layers 42 from the base material 41, the conveying roller 313 supports the adhesive tape 7 from the opposite side of the heat-sensitive tape 4.

With the heat-sensitive tape 4 and adhesive tape 7 superimposed, the heat-sensitive tape 4 and adhesive tape 7 are bonded together between the pinch roller 14 and conveying roller 313, thereby forming the laminated tape 9.

As in the depicted embodiment, the configuration according to the first modification can expand the range of reproducible colors while protecting the heat-sensitive layers 42.

2. Second Modification

Figure 11:
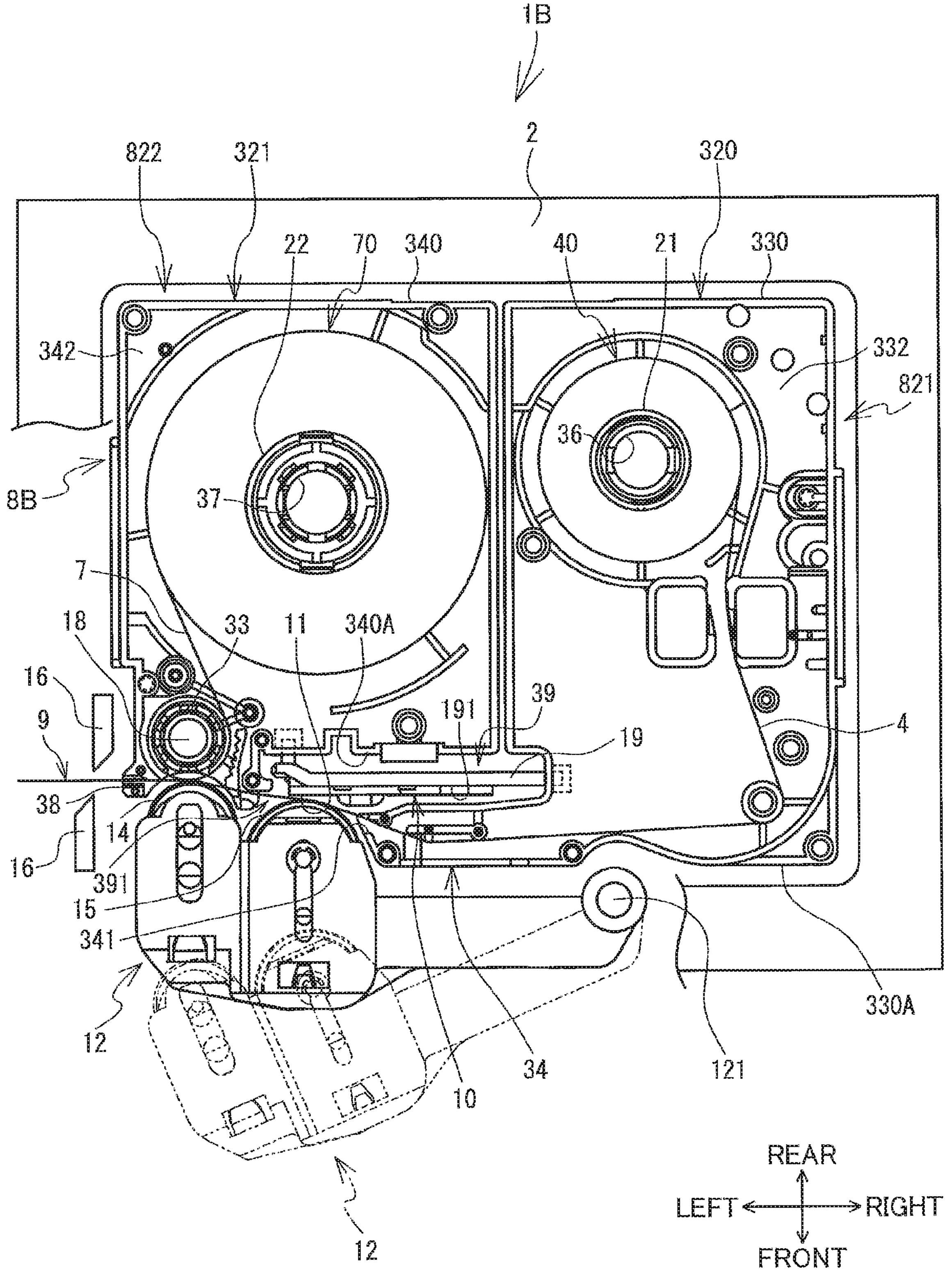
FIG. 11 is a plan view of a cassette attachment portion 8B of a thermal printer TB according to a second modification to the embodiment, and illustrating a state where tape cassettes 320 and 330 according to the second modification are attached to the cassette attachment portion 8B.

FIG. 11 illustrates a printing system according to a second modification to the embodiment. The printing system according to the second modification includes a thermal printer 1B, and tape cassettes 320 and 321. Unlike the embodiment described above, the second modification utilizes a plurality (two in this example) of tape cassettes 320 and 321, with the first supply roll 40 and second supply roll 70 accommodated in the respective tape cassette 320 and tape cassette 321. In the second modification, the same heat-sensitive tape 4 and adhesive tape 7 of the depicted embodiment are used. The thermal printer 1B of the second modification has the same configuration as the thermal printer 1 of the embodiment, except for the structure of the cassette attachment portion 8. In the second modification, the same control (the laminated tape creation process) as that used in the embodiment is employed.

The thermal printer 1B includes a cassette attachment portion 8A, in place of the cassette attachment portion 8 of the embodiment. The cassette attachment portion 8B includes a first attachment portion 821, and a second attachment portion 822. The first attachment portion 821 constitutes an approximate right half of the cassette attachment portion 8B. The tape cassette 320 is detachably mounted in the first attachment portion 821. The second attachment portion 822 constitutes an approximate left half of the cassette attachment portion 8B. The tape cassette 321 is detachably mounted in the second attachment portion 822.

The tape cassette 320 corresponds to a right-side portion of the tape cassette 30 of the embodiment when the tape cassette 30 is divided in half in the left-right direction between the first supply roll 40 and second supply roll 70. The tape cassette 320 has a cassette case 330. The cassette case 330 has a general rectangular parallelepiped shape and is configured by assembling together a lower case 332, and an upper case (not shown). The first supply roll 40 is accommodated inside the cassette case 330. The arm part 34 is provided on a front surface 330A of the cassette case 330.

The tape cassette 321 corresponds to a left-side portion of the tape cassette 30 of the embodiment when the tape cassette 30 is divided in half in the left-right direction between the first supply roll 40 and second supply roll 70. The tape cassette 321 has a cassette case 340. The cassette case 340 has a general rectangular parallelepiped shape and is configured by assembling together a lower case 342, and an upper case (not shown). The second supply roll 70 is accommodated inside the cassette case 340. The conveying roller 33 is disposed in a left-front corner portion of the cassette case 340. The head insertion section 39 is formed by the arm part 34 and a front surface 340A of the cassette ease 340. The cassette case 330 also includes the guide part 38.

The heat-sensitive tape 4 is drawn frontward off the right side of the first supply roll 40, and then turned leftward in a right-front corner portion of the cassette case 330. The heat-sensitive tape 4 passes through the inside of the arm park 34 and subsequently exits the cassette ease 330 through the opening 341.

While in the head opening 391, the side of the heat-sensitive tape 4 having the heat-sensitive layers 42 opposes the thermal head 10 while the base material 41 side of the heat-sensitive tape 4 opposes the platen roller 15. Thus, the thermal head 10 is positioned on the opposite side of the heat-sensitive layers 42 from the base material 41 (i.e., the rear side of the heat-sensitive tape 4) while the tape cassette 320 is mounted in the first attachment portion 821 and the tape cassette 321 is mounted in the second attachment portion 822. Accordingly, the thermal head 10 can heat the heat-sensitive tape 4 in the head opening 391 from the opposite side of the base material 41.

The heat-sensitive tape 4 passes through the head opening 391 and between the conveying roller 33 and pinch roller 14. At this time, the heat-sensitive layer 42 side of the heat-sensitive tape 4 opposes the conveying roller 33 while the base material 41 side of the heat-sensitive tape 4 opposes the pinch roller 14.

The adhesive tape 7 is pulled frontward from the left side of the second supply roll 70. The adhesive tape 7 curves leftward while in contact with the right-front circumferential portion of the conveying roller 33. At this time, the release paper 75 side of the adhesive tape 7 opposes the conveying roller 33 while the double-sided adhesive tape 71 side opposes the pinch roller 14. Accordingly, with the adhesive tape 7 overlapping the heat-sensitive tape 4 on the opposite side of the heat-sensitive layers 42 from the base material 41, the conveying roller 33 supports the adhesive tape 7 from the opposite side of the heat-sensitive tape 4.

With the heat-sensitive tape 4 and adhesive tape 7 superimposed, the heat-sensitive tape 4 and adhesive tape 7 are bonded together between the pinch roller 14 and conveying roller 33, thereby forming the laminated tape 9. The laminated tape 9 is discharged from the cassette case 340 after passing through the interior of the guide part 38.

As in the depicted embodiment, the configuration according to the second modification can expand the range of reproducible colors while protecting the heat-sensitive layers 42.

3. Third Modification

Figure 12A:
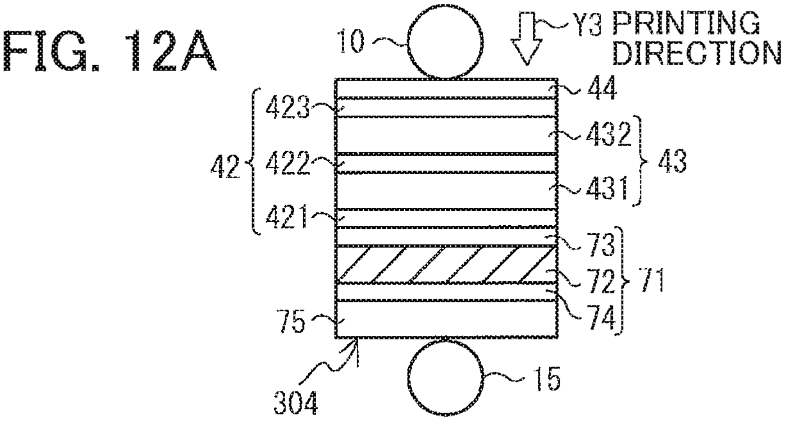
FIG. 12A is a plan view illustrating layers of a heat-sensitive tape 304 according to a third modification to the embodiment.
Figure 12B:
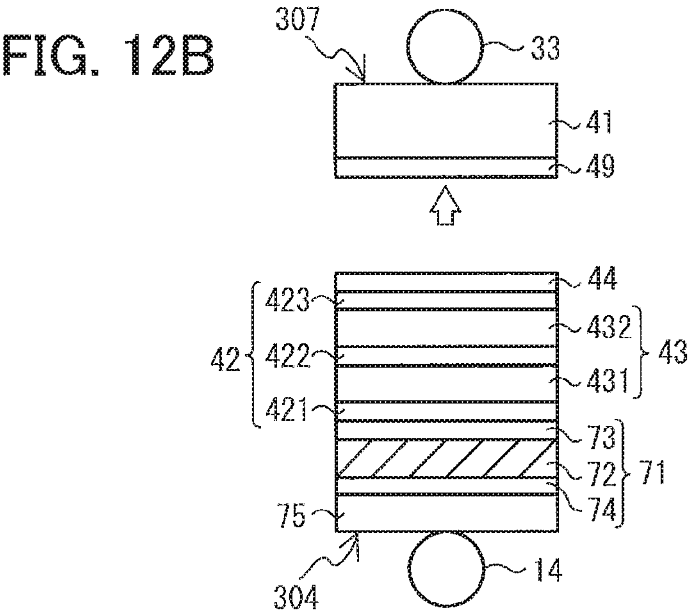
FIG. 12B is a plan view illustrating layers of an adhesive tape 307 according to the third modification to be bonded to the heat-sensitive tape 304.
Figure 12C:
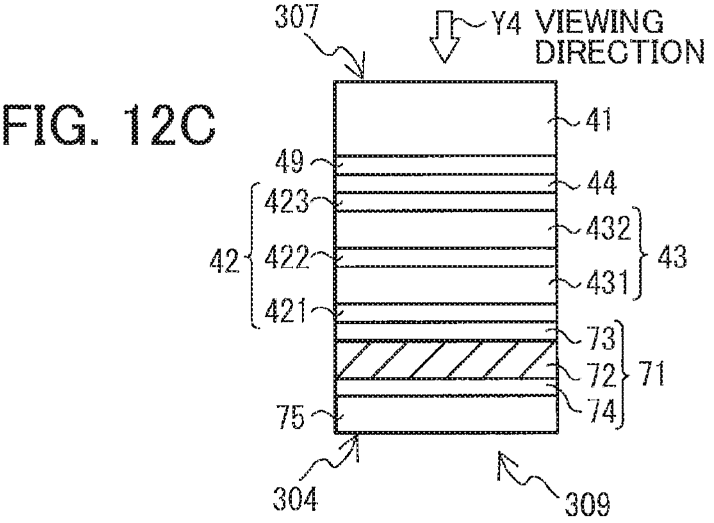
FIG. 12C is a plan view illustrating layers of a laminated tape 309 configured of the heat-sensitive tape 304 and adhesive tape 307 according to the third modification.

FIGS. 12A through 12C illustrate a configuration according to a third modification to the embodiment described above. The third modification is different from the embodiment in that: a heat-sensitive tape 304 is employed in place of the heat-sensitive tape 4; and an adhesive tape 307 is employed in place of the adhesive tape 7. That is, in the third modification, a tape cassette including the adhesive tape 307 and adhesive tape 307 (corresponding to the tape cassette 30 excluding the heat-sensitive tape 4 and adhesive tape 7 in the embodiment) is used in the thermal printer 1 of the embodiment.

As shown in FIG. 12A, the heat-sensitive tape 304 has the double-sided adhesive tape 71, release paper 75, heat-sensitive layers 42, heat-insulating layers 43, and overcoat layer 44. The heat-sensitive layers 42 include the first heat-sensitive layer 421, second heat-sensitive layer 422, and third heat-sensitive layer 423. The heat-insulating layers 43 include the first heat-insulating layer 431, and second heat-insulating layer 432.

In the heat-sensitive tape 304, the release paper 75, second adhesive layer 74, sheet 72, first adhesive layer 73, first heat-sensitive layer 421, first heat-insulating layer 431, second heat-sensitive layer 422, second heat-insulating layer 432, third heat-sensitive layer 423, and overcoat layer 44 are laminated in a thickness direction of the heat-sensitive tape 304 (the vertical direction in FIG. 12A) in the order given, beginning from the bottom of the heat-sensitive tape 304. As shown in FIG. 12B, the adhesive tape 307 has the base material 41, and an adhesive layer 49. The adhesive layer 49 is provided on the bottom surface of the base material 41.

As shown in FIG. 12A, the side of the heat-sensitive tape 304 having the heat-sensitive layers 42 opposes the thermal head 10 while the release paper 75 side of the heat-sensitive tape 304 opposes the platen roller 15 in the head opening 391. Thus, the thermal head 10 is positioned on the opposite side of the heat-sensitive layers 42 from the release paper 75 (i.e., the rear side of the heat-sensitive tape 304) while the tape cassette is mounted in the cassette attachment portion 8. Accordingly, the thermal head 10 can heat the heat-sensitive tape 304 in the head opening 391 from the opposite side of the release paper 75 (see a printing direction Y3).

As shown in FIG. 12B, when the heat-sensitive tape 304 is between the conveying roller 33 and pinch roller 14, the side of the heat-sensitive tape 304 constituting the heat-sensitive layers 42 opposes the conveying roller 33 while the release paper 75 side of the heat-sensitive tape 304 opposes the pinch roller 14. When the adhesive tape 307 is between the conveying roller 33 and pinch roller 14, the base material 41 side of the adhesive tape 307 opposes the conveying roller 33 while the adhesive layer 49 side opposes the pinch roller 14. Accordingly, with the adhesive tape 307 overlapping the heat-sensitive tape 304 on the opposite side of the heat-sensitive layers 42 from the release paper 75, the conveying roller 33 supports the adhesive tape 307 from the opposite side of the heat-sensitive tape 304.

With the heat-sensitive tape 304 and adhesive tape 307 superimposed, the heat-sensitive tape 304 and adhesive tape 307 are bonded together between the pinch roller 14 and conveying roller 33, thereby forming a laminated tape 309.

In the laminated tape 309 shown in FIG. 12C, the release paper 75, second adhesive layer 74, sheet 72, first adhesive layer 73, first heat-sensitive layer 421, first heat-insulating layer 431, second heat-sensitive layer 422, second heat-insulating layer 432, third heat-sensitive layer 423, overcoat layer 44, adhesive layer 49, and base material 41 are stacked in the thickness direction in the order given, beginning from the bottom of the laminated tape 309.

As with the embodiment described above, the configuration of the third modification can expand the range of reproducible colors while protecting the heat-sensitive layers 42. Additionally, in the third modification, the user views the laminated tape 309 from the base material 41 side (see a viewing direction Y4). Accordingly, unlike in the depicted embodiment, the printing direction Y3 and viewing direction Y4 are the same direction relative to the heat-sensitive tape 304 in the third modification. Therefore, the third modification does not require the CPU 91 to perform a process to invert an image to be formed on the laminated tape 309 (see S2 of FIG. 7). Hence, the third modification can simplify the laminated tape creation process.

4. Other Variations

In addition to the first through third modifications described above, many modifications and variations may be made to the depicted embodiment.

For example, the base material 41 of the embodiment may be a foamed PET film. Alternatively, the base material 41 may be a resin film formed of polyethylene (PE), polypropylene (PP), ethylene vinyl acetate (EVA) copolymer, ethylene methacrylic acid (EMAA) copolymer, polybutene (PB), polybutadiene (BDR), polymethylpentene (PMP), polyethylene naphthalate (PEN), polybutylene terephthalate (PBT), polyimide (PI), polyetherimide (PEI), polyetherketone (PEK), polyether ether ketone (PEEK), nylon (NY), polyamide (PA), polycarbonate (PC), polystyrene (PS), foamed/expanded polystyrene (FS/EPS), polyvinyl chloride (PVC), polyvinylidene chloride (PVDC), saponified ethylene vinyl alcohol (EVOH), polyvinyl alcohol (PVA), plain transparent (PT) cellophane, moisture-proof sealable transparent (MST) cellophane, polyacrylonitrile (PAN), vinylon (VL), polyurethane (PU), triacetyl cellulose (TAC), or the like. In these cases, the base material 41 may be a foamed or a non-foamed resin film.

Since foamed resin has lower thermal conductivity than the same resin that is not foamed, the thermal conductivity of the base material 41 can be lowered through a simple construction when the base material 41 is configured of a foamed resin film. When the base material 41 has low thermal conductivity, heat inputted into the heat-sensitive tape 4 from the heat-sensitive layer 42 side is less likely to be diffused in the base material 41 when printing with the thermal printer 1. Accordingly, using a foamed resin film as the base material 41 can reduce the quantity of heat needed to be inputted into the heat-sensitive tape 4 for developing color in the heat-sensitive layers 42 through a simple configuration. In other words, by using foamed resin film for the base material 41, the quantity of heat inputted into the heat-sensitive tape 4 for producing color in the heat-sensitive layers 42 can be reduced without needing to use a special material in the base material 41 for reducing thermal conductivity.

When the adhesive tape 7 is bonded to the heat-sensitive tape 4 after the thermal printer 1 has printed on the heat-sensitive tape 4, the base material 41 functions as a laminate member for protecting the heat-sensitive layers 42. If the base material 41 has low thermal conductivity, the base material 41 can better prevent unintended discoloration in the heat-sensitive layers 42 caused by heat inputted into the base material 41 side than when the base material 41 is formed of material having high thermal conductivity.

When the base material 41 is configured of non-foamed resin film, the visible light transmittance of the base material 41 tends to be higher than when the base material 41 is formed of foamed resin film. Accordingly, the printed image in the laminated tape 9 will appear clear and distinct to the user.

Provided that the base material 41 has sufficient visible light transmittance for its application, the base material 41 may be formed of a metal foil (aluminum foil or copper foil), a vacuum metalized (VM) film, or the like, or may be configured of one of various types of paper, such as translucent paper, washi (traditional Japanese paper), wood-free paper, dust-free paper, glassine, clay-coated paper, resin-coated paper, laminated paper (polyethylene-laminated paper, polypropylene-laminated paper, etc.), synthetic paper, kraft paper, and the like. The first protective layer 591 may also be formed of a nonwoven cloth or a glass cloth, for example.

The overcoat layer 44 of the embodiment may transmit more yellow visible light than blue visible light, and may be translucent or opaque. Alternatively, the overcoat layer 44 may be made of a material identical to that of the heat-insulating layers 43. In other words, as the overcoat layer 44, another heat-insulating layer (third heat-insulating layer) may be provided. Still alternatively, the overcoat layer 44 may be omitted. In this case, thermal conductivity from the thermal head 10 to the heat-sensitive layers 42 is enhanced. Accordingly, the thermal printer 1 can shorten a heating period by the thermal head 10, and can reduce the cost required for the overcoat layer 44.

The double-sided adhesive tape 71 (the sheet 72) of the embodiment may be a color other than white or may be colored with one or a plurality of colors. Thus, a pattern or the like may be applied to the double-sided adhesive tape 71 (the sheet 72). By changing the color of the sheet 72, the tape cassette 30 can provide a variety of background colors and patterns that the user sees when viewing the laminated tape 9 from the heat-sensitive tape 4 side. The thickness of the adhesive tape 7 can more easily be reduced when coloring the sheet 72 than when coloring the first adhesive layer 73, particularly when the double-sided adhesive tape 71 is given a dark color.

The double-sided adhesive tape 71 may be opaque, or may be translucent or transparent. The visible light transmittance of the sheet 72 may be lower than the visible light transmittance of one of the layers in the heat-sensitive tape 4, may be higher than the visible light transmittance of all layers in the heat-sensitive tape 4, or may be higher than the visible light transmittance for one of the layers in the heat-sensitive tape 4. When the double-sided adhesive tape 71 is transparent or translucent (i.e., when the double-sided adhesive tape 71 has visible light transmittance), if the laminated tape 9 is affixed to a prescribed wall, for example, the wall becomes the background. Accordingly, the user can freely modify the background according to the wall to which the laminated tape 9 is affixed. At least one of the first adhesive layer 73 and second adhesive layer 74 may be colored or made opaque.

The adhesive tape 7 in the embodiment may be configured of the sheet 72 and first adhesive layer 73. In this case, once the laminated tape 9 has been formed, the user may apply adhesive to a surface of the sheet 72 opposite the first adhesive layer 73 (i.e., the exposed surface). Still alternatively, the adhesive tape 7 may also be self-adhesive. The second supply roll 70 in the tape cassette 30 can be made more compact when the adhesive tape 7 is thin. Accordingly, the cassette case 31 of the tape cassette 30 can be made more compact.

The heat-sensitive layers 42 in the present embodiment may be configured of just two layers. In other words, the third heat-sensitive layer 423 may be omitted and, hence, the second heat-insulating layer 432 may also be omitted. In this case, the first heat-sensitive layer 421 may be formed by applying a chemical agent to the bottom surface of the first heat-insulating layer 431 while the second heat-sensitive layer 422 is formed by applying a chemical agent to the top surface of the first heat-insulating layer 431. Thus, it is sufficient for the heat-sensitive tape 4 to include at least one heat-insulating layer.

Alternatively, the heat-sensitive layers 42 in the present embodiment may be configured of four or more layers. For example, a fourth heat-sensitive layer (not shown) may be provided on the opposite side of the third heat-sensitive layer 423 from the second heat-sensitive layer 422. In this case, the fourth heat-sensitive layer develops a fourth color when a fourth temperature is exceeded. The fourth temperature is higher than the third temperature. The fourth color may be black, for example. In this configuration, a third heat-insulating layer (not shown) is provided between the third heat-sensitive layer 423 and the fourth heat-sensitive layer in the thickness direction.

The first color, second color, and third color in the depicted embodiment may be colors other than cyan, magenta, and yellow. For example, the first, second, and third colors may all be the same color. When multiple layers of the same color are superimposed in the laminated tape 9, the laminated tape 9 can depict depth in the formed image.

The heat-sensitive layers 42 may be formed by applying chemical agent to the top surfaces of the heat-insulating layers 43. Alternatively, the heat-sensitive layers 42 may be preformed in sheets and bonded by adhesive to the respective heat-insulating layers 43.

The ultraviolet light transmittance of the base material 41 may be higher than that of the first heat-insulating layer 431 or may be higher than the ultraviolet light transmittance of all heat-insulating layers 43. The thermal conductivity of the base material 41 may be higher than the thermal conductivity of the first heat-insulating layer 431 or may be higher than the thermal conductivity of all heat-insulating layers 43. The thickness of the base material 41 may be less than the thickness of the first heat-insulating layer 431 or may be less than the thickness of all heat-insulating layers 43.

The refractive index of the base material 41 may be lower than the refractive index of the first heat-insulating layer 431, may be lower than the refractive index of one of the heat-insulating layers 43, or may be lower than the refractive index of all heat-insulating layers 43. When the refractive index of the base material 41 is low, light incident on the base material 41 side of the heat-sensitive tape 4 tends to be completely reflected by the interface between the base material 41 and one of the heat-insulating layers 43. Accordingly, the tape cassette 30 can provide the user with the laminated tape 9 having low gloss, known as a matte finish.

The score line 76 described in the embodiment need not be formed in a straight line, but may be formed in a wavy line or the like. Further, a plurality of score lines 76 laterally juxtaposed may be formed in the release paper 75 rather than just a single score line 76. Alternatively, a plurality of score lines 76 extending laterally may be formed at prescribed intervals in the longitudinal direction of the release paper 75. The score lines 76 may also extend obliquely to the lateral and longitudinal directions.

The cassette case 31 in the embodiment described above may accommodate a first fanfold stack in place of the first supply roll 40. That is, the first fanfold stack may be accommodated in the cassette case 31 for supplying the heat-sensitive tape 4 that has been accordion-folded into a stack. A second fanfold stack may be accommodated in the cassette case 31 in place of the second supply roll 70. In other words, the second fanfold stack may be accommodated in the cassette case 31 for supplying the adhesive tape 7 that has been accordion-folded into a stack.

The first supply roll 40 of the depicted embodiment may be a coreless roll that omits the first tape spool 21. Similarly, the second supply roll 70 may be a coreless roll that omits the second tape spool 22.

The conveying roller 33 described in the embodiment may be provided as part of the thermal printer 1 rather than the tape cassette 30. In other words, the conveying roller 33 may be pre-mounted on the drive shaft 18, and the printed heat-sensitive tape 4 and adhesive tape 7 may be bonded together by members on the thermal printer 1 side (the conveying roller 33 pre-mounted on the drive shaft 18, and the pinch roller 14).

The CPU 91 need not perform the process of S2 described in the embodiment. In other words, the CPU 91 need not create inverted image data. In this case, the user may invert the image to be formed on the laminated tape 9 and may input this inverted image data into the thermal printer 1. Thus, if the image to be formed on the laminated tape 9 is "q", the user may specify "d". The processes in S1 and S2 may also be executed on an external device connected to the thermal printer 1, such as a personal computer or a smartphone.

The user may also cut the laminated tape 9 manually. The cutting mechanism 16 may also execute a half-cut by cutting through the entire heat-sensitive tape 4 of the laminated tape 9 in the thickness direction while the adhesive tape 7 remains continuously intact in the longitudinal direction at the cutting position.

The user may also manually bond the printed heat-sensitive tape 4 to the adhesive tape 7. In this case, the thermal printer 1 need not be provided with a mechanism for bonding the heat-sensitive tape 4 to the adhesive tape 7.

Further, a portion of the top surface, bottom surface, and side surfaces of the cassette case 31 may be eliminated. The conveying roller 33 may also be a non-rotatable body, such as a fixed cylindrical body or plate-shaped body. In this case, the drive force of the conveying motor 95 may be transmitted to the pinch roller 14, for example.

In the depicted embodiment, the heat-sensitive tape 4 has a plurality of heat-sensitive layers 42, but the heat-sensitive tape 4 may instead have just a single heat-sensitive layer. In this case, the base material 41, first heat-sensitive layer 421, first heat-insulating layer 431, and overcoat layer 44 are laminated in the order given, for example, After the heat-sensitive tape 4 has been printed, the adhesive tape 7 having the score line 76 is bonded to the opposite side of the heat-sensitive tape 4 from the base material 41. Accordingly, this tape cassette can suppress deterioration in print quality due to the score line 76. That is, since the adhesive tape 7 is bonded to the heat-sensitive tape 4 after the heat-sensitive tape 4 is printed, the tape cassette 30 can suppress occurrence of the white line effect not only when the heat-sensitive tape 4 possesses a plurality of heat-sensitive layers 42, but also when the heat-sensitive tape 4 possesses just a single heat-sensitive layer.

Note that when the heat-sensitive tape 4 possesses just a single heat-sensitive layer, both the first heat-insulating layer 431 and the overcoat layer 44 may be omitted. In this case, the single heat-sensitive layer may be formed by applying a chemical agent to the top surface of the base material 41.

The CPU 91 may create image data representing an inverted image in the process of S2 by flipping the content of the image about an axis of rotation extending parallel to the lateral direction of the heat-sensitive tape 4 and passing through the longitudinal center of the heat-sensitive tape 4 when viewing the image in the printing direction Y2. More specifically, if an image of "q" has been specified, the CPU 91 may invert the image of "q" to create image data representing "p" instead of the image "d" described in the embodiment.

In place of the CPU 91, the thermal printer 1 may employ a microcomputer, application-specific integrated circuits (ASICs), field-programmable gate arrays (FPGAs), or the like as the processor. The process for creating a laminated tape may be a distributed process performed by a plurality of processors. The non-transitory storage medium may be any storage medium capable of holding information, regardless of the duration that the information is stored. The non-transitory storage medium need not include transitory storage media (conveyed signals, for example). The program may be downloaded from a server connected to a network (i.e., transmitted as a transmission signal) and stored in the flash memory 92, for example. In this case, the program may be saved in a non-transitory storage medium, such as a hard disk drive provided in the server.

The variations described above may be combined in any way that does not produce inconsistencies.

<Remarks>

The tape cassette 30 is an example of a cartridge. The cassette case 31 is an example of a cartridge case. The heat-sensitive tape 4 is an example of a heat-sensitive medium, and is also an example of a medium. The adhesive tape 7 is an example of an adhesive medium. The laminated tape 9 is an example of a laminated medium. The base material 41 is an example of a base material. The heat-sensitive layers 42 is an example of a plurality of heat-sensitive layers. The first heat-sensitive layer 421 and second heat-sensitive layer 422 are examples of first and second heat-sensitive layers, respectively. The heat-insulating layers 43 is an example of at least one heat-insulating layer. The first heat-insulating layer 431 is an example of a first hear-insulating layer. The double-sided adhesive tape 71 is an example of a double-sided adhesive medium. The sheet 72 is an example of a sheet, and the first adhesive layer 73 and second adhesive layer 74 are examples of adhesive layers. The release paper 75 is an example of a release paper. The overcoat layer 44 is an example of an overcoat layer. The guide part 38 is an example of a guide part. The opening 341 is an example of an opening. The conveying roller 33 is an example of a support part. The CPU 91 is an example of a controller. The thermal head 10 is an example of a thermal head.

What is claimed is:

1. A cartridge for use with a printer comprising:
a cartridge case;
a first supply portion retained in the cartridge case and including a heat-sensitive medium defining a thickness in a thickness direction, the heat-sensitive medium having a first surface and a second surface opposite each other in the thickness direction; and
a second supply portion retained in the cartridge case and including an adhesive medium,
wherein the heat-sensitive medium comprises:
a base material having visible light transmittance, the base material constituting the first surface;
a plurality of heat-sensitive layers having visible light transmittance, the plurality of heat-sensitive layers comprising:
a first heat-sensitive layer configured to produce a first color with a first coloring region when heated above a first temperature; and
a second heat-sensitive layer configured to produce a second color with a second coloring region when heated above a second temperature higher than the first temperature; and
at least one heat-insulating layer having visible light transmittance and including a first heat-insulating layer,
wherein the cartridge case comprises:
an opening through which the heat-sensitive medium conveyed from the first supply portion is configured to be exposed to an outside of the cartridge case; and
a guide part positioned downstream of the opening in a conveying direction of the heat-sensitive medium, the guide part being configured to guide the heat-sensitive medium and the adhesive medium bonded to the second surface of the heat-sensitive medium such that the adhesive medium is positioned opposite the base material with respect to the plurality of heat-sensitive layers to create a laminated medium,
wherein the adhesive medium comprises:
a double-sided adhesive medium; and
a release paper affixed to the double-sided adhesive medium,
wherein the double-sided adhesive medium is white,
wherein the base material, the first heat-sensitive layer, the first heat-insulating layer, the second heat-sensitive layer, and the double-sided adhesive medium are stacked in order from the first surface toward the release paper in the thickness direction,
wherein the first color and the second color are visible through the base material with the double-sided adhesive medium serving as a background, and
wherein the first coloring region in the first heat-sensitive layer is not covered by the second coloring region in the second heat-sensitive layer when the laminated medium is fixed on an object and viewed from the first surface in the thickness direction.

2. The cartridge according to claim 1, wherein the plurality of heat-sensitive layers further comprises a third heat-sensitive layer configured to produce a third color when heated above a third temperature higher than the second temperature,
wherein the at least one heat-insulating layer further comprises a second heat-insulating layer, and
wherein the base material, the first heat-sensitive layer, the first heat-insulating layer, the second heat-sensitive layer, the second heat-insulating layer and the third heat-sensitive layer are stacked in a recited order in the thickness direction.

3. The cartridge according to claim 2, wherein the first color is cyan, the second color is magenta, and the third color is yellow.

4. The cartridge according to claim 1, wherein the release paper is formed with a score line, and the double-sided adhesive medium is continuous across the score line.

5. The cartridge according to claim 1, wherein the heat-sensitive medium further comprises an overcoat layer capable of transmitting more blue visible light than yellow visible light, the overcoat layer being provided opposite the base material with respect to the plurality of heat-sensitive layers.

6. The cartridge according to claim 1, wherein the base material is a resin film.

7. The cartridge according to claim 6, wherein the resin film is a foamed resin film having gas bubbles trapped therein.

8. The cartridge according to claim 6, wherein the resin film is a polyethylene terephthalate (PET) film.

9. The cartridge according to claim 1, wherein the base material has a thermal conductivity lower than a thermal conductivity of the first heat-insulating layer.

10. The cartridge according to claim 1, wherein the at least one heat-insulating layer includes a plurality of heat-insulating layers, and wherein the base material has a thermal conductivity lower than a thermal conductivity of one of the plurality of heat-insulating layers.

11. The cartridge according to claim 1, wherein the base material has a thickness greater than a thickness of the first heat-insulating layer.

12. The cartridge according to claim 1, wherein the at least one heat-insulating layer includes a plurality of heat-insulating layers, and wherein the base material has a thickness greater than a thickness of one of the plurality of heat-insulating layers.

13. The cartridge according to claim 1, wherein the base material has an ultraviolet light transmittance lower than an ultraviolet light transmittance of the first heat-insulating layer.

14. The cartridge according to claim 1, wherein the at least one heat-insulating layer includes a plurality of heat-insulating layers, and wherein the base material has an ultraviolet light transmittance lower than an ultraviolet light transmittance of one of the plurality of heat-insulating layers.

15. The cartridge according to claim 1, wherein the base material has a refractive index higher than a refractive index of the at least one heat-insulating layer.

16. The cartridge according to claim 1, wherein the base material has a refractive index lower than a refractive index of the at least one heat-insulating layer.

17. The cartridge according to claim 1, wherein the first supply portion is a first supply roll which is a roll of the heat-sensitive medium.

18. The cartridge according to claim 17, wherein the first supply roll is configured by winding the heat-sensitive medium with the plurality of heat-sensitive layers positioned on an inside of the base material.

19. The cartridge according to claim 1, wherein the second supply portion is a second supply roll which is a roll of the adhesive medium.

20. The cartridge according to claim 19, wherein the adhesive medium has an adhesive surface to be bonded to the second surface of the heat-sensitive medium, and another adhesive surface opposite the adhesive surface, and wherein the second supply roll is configured by winding the adhesive medium such that the adhesive surface is positioned on an inside of the another adhesive surface.

21. The cartridge according to claim 1, wherein the cartridge case further comprises a support part positioned between the opening and the guide part in the conveying direction, the support part being configured to support the adhesive medium while the adhesive medium is superposed over the second surface of the heat-sensitive medium, and wherein the support part supporting the adhesive medium is positioned opposite the heat-sensitive medium with respect to the adhesive medium in the thickness direction.

22. The cartridge according to claim 21, wherein the support part is a roller rotatably supported by the cartridge case.

23. A thermal printer comprising:

a cartridge attachment portion to which the cartridge according to claim 1 is detachably attachable; and a thermal head configured to heat the heat-sensitive medium exposed to an outside of the cartridge case through the opening while the cartridge is attached to the cartridge attachment portion, the thermal head being positioned opposite the base material with respect to the plurality of heat-sensitive layers in the thickness direction while the cartridge is attached to the cartridge attachment portion.

24. The thermal printer according to claim 23, further comprising a controller configured to control the thermal head, wherein the thermal head includes a plurality of heating elements, the controller being configured to selectively heat the heating elements to form an inverted image in the heat-sensitive medium, the inverted image being formed by flipping an image to be formed on the heat-sensitive medium when viewed in a direction from the thermal head toward the heat-sensitive medium.

25. A medium for use with a printer, the medium comprising:

a first surface and a second surface opposite to the first surface in a thickness direction;

a base material having visible light transmittance, the base material including the first surface;

a plurality of heat-sensitive layers having visible light transmittance, the plurality of heat-sensitive layers comprising:

a first heat-sensitive layer configured to produce a first color with a first coloring region when heated above a first temperature; and a second heat-sensitive layer configured to produce a second color with a second coloring region when heated above a second temperature higher than the first temperature;

at least one heat-insulating layer having visible light transmittance and including a first heat-insulating layer; and an adhesive medium comprising a double-sided adhesive medium and a release paper affixed to the double-sided adhesive medium, wherein the double-sided adhesive medium is white, wherein the base material, the first heat-sensitive layer, the first heat-insulating layer, the second heat-sensitive layer, and the double-sided adhesive medium are stacked in order from the first surface toward the release paper in the thickness direction, and wherein the first color and the second color are visible through the base material with the double-sided adhesive medium serving as a background, and wherein the first coloring region in the first heat-sensitive layer is not covered by the second coloring region in the second heat-sensitive layer when the medium is fixed on an object and viewed from the first surface in the thickness direction.

26. A method for creating the medium according to claim 25 with a thermal printer, the method comprising:

performing printing on a stack of the base material, the first heat-sensitive layer, the first heat-insulating layer, and the second heat-sensitive layer through application of heat to a surface of the stack, the surface being opposite the base material with respect to the heat-sensitive layers; and bonding the double-sided adhesive medium of the adhesive medium to the surface of the stack to create the medium.

* * * * *